United States Patent
Li et al.

(10) Patent No.: US 10,554,357 B2
(45) Date of Patent: Feb. 4, 2020

(54) DATA TRANSMISSION METHOD, NETWORK DEVICE, AND TERMINAL DEVICE

(71) Applicant: Huawei Technologies Co., Ltd., Shenzhen (CN)

(72) Inventors: Chaojun Li, Beijing (CN); Sha Ma, Beijing (CN); Yongxia Lyu, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/971,961

(22) Filed: May 4, 2018

(65) Prior Publication Data

US 2018/0254869 A1    Sep. 6, 2018

Related U.S. Application Data

(63) Continuation of application No. PCT/CN2015/094001, filed on Nov. 6, 2015.

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01); *H04W 72/0446* (2013.01)

(58) Field of Classification Search
CPC ....... H04L 5/0048; H04L 5/00; H04L 5/0051; H04W 72/04; H04W 72/042; H04W 72/0446
See application file for complete search history.

(56) References Cited

U.S. PATENT DOCUMENTS

2012/0140717 A1    6/2012  Zhu et al.
2013/0114756 A1    5/2013  Jia et al.
(Continued)

FOREIGN PATENT DOCUMENTS

CN    101977099 A    2/2011
CN    102098086 A    6/2011
(Continued)

OTHER PUBLICATIONS

"3rd Generation Partnership Project; Technical Specification Group Radio Access Network; Evolved Universal Terrestrial Radio Access (E-UTRA); Physical channels and modulation(Release 12)," 3GPP TS 36.211 V12.7.0, 3rd Generation Partnership Project, Valbonne, France (Sep. 2015).

(Continued)

*Primary Examiner* — Ronald B Abelson
(74) *Attorney, Agent, or Firm* — Leydig, Voit & Mayer, Ltd.

(57) ABSTRACT

Embodiments of the present disclosure provide a data transmission method, a network device, and a terminal. The data transmission method includes: receiving, by a network device, a first reference signal and a first physical channel that are sent by a first terminal device, where the first reference signal is at the $i^{th}$ symbol in a slot, i is a positive integer less than 7, the first physical channel occupies n symbols in the slot, and n is 1, 2, or 3; and demodulating, by the network device, the first physical channel according to the first reference signal. According to the present disclosure, a data transmission latency can be reduced.

18 Claims, 8 Drawing Sheets

(56) References Cited

U.S. PATENT DOCUMENTS

2013/0135984 A1     5/2013   Choi et al.
2014/0010182 A1     1/2014   Chunli et al.
2014/0016574 A1*   1/2014   Seo .................... H04W 76/023
2017/0257202 A1     9/2017   Zhang et al.

FOREIGN PATENT DOCUMENTS

| | | |
|---|---|---|
| CN | 103874203 A | 6/2014 |
| JP | 2013503581 A | 1/2013 |
| WO | 2015022137 A1 | 2/2015 |
| WO | 2015154505 A1 | 10/2015 |

OTHER PUBLICATIONS

"3rd Generation Partnership Project; Technical Specification Group Radio Access Network; Evolved Universal Terrestrial Radio Access (E-UTRA); Multiplexing and channel coding (Release 12)," 3GPP TS 36.212 V12.6.0, 3rd Generation Partnership Project, Valbonne, France (Sep. 2015).

* cited by examiner

DATA TRANSMISSION METHOD, NETWORK DEVICE, AND TERMINAL DEVICE

CROSS-REFERENCE TO RELATED APPLICATIONS

This application is a continuation of International Application No. PCT/CN2015/094001, filed on Nov. 6, 2015, the disclosure of which is hereby incorporated by reference in its entirety.

TECHNICAL FIELD

The present disclosure relates to the communications field, and in particular, to a data transmission method, a network device, and a terminal device.

BACKGROUND

Long Term Evolution (LTE) is a technical standard developed by the 3rd Generation Partnership Project (3GPP) organization. In an LTE system, duration of one subframe is 1 ms, and each subframe is equally divided into two slots, where duration of each slot is 0.5 ms. In the LTE system, a transmission time interval (TTI) is duration of one subframe.

In a wireless communications system, a latency is one of important factors affecting user experience. During uplink transmission in the LTE system, after receiving physical uplink shared channel (PUSCH) information, a base station needs to feed back a reception result to a terminal device after a specific time. For example, an acknowledgement (ACK) character is fed back when reception is correct, or a negative acknowledgement (NACK) character is fed back when reception is incorrect. If each data packet is sent in one subframe, the base station spends a relatively long time decoding the data packet. In addition, if reception of the data packet is incorrect, a minimum time interval between retransmission of the data packet and initial transmission of the data packet is also relatively long. This leads to a relatively long data transmission latency, affecting use experience of a user.

SUMMARY

In view of this, an objective of embodiments of the present disclosure is to provide a data transmission method, a network device, and a terminal device, so as to resolve a problem that a data transmission latency is relatively long.

To resolve the foregoing technical problem, the embodiments of the present disclosure disclose the following technical solutions:

According to a first aspect, a data transmission method is provided, where the method includes:

receiving, by a network device, a first reference signal and a first physical channel that are sent by a first terminal device, where the first reference signal is at the $i^{th}$ symbol in a slot, i is a positive integer less than 7, the first physical channel occupies n symbols in the slot, and n is 1, 2, or 3; and demodulating, by the network device, the first physical channel according to the first reference signal.

With reference to the first aspect, in a first possible implementation of the first aspect, the slot includes seven symbols, i is 4, and the first physical channel is at a first symbol set or a second symbol set;

the first symbol set includes the first three of the seven symbols; and the second symbol set includes the fifth symbol, the sixth symbol, and the seventh symbol in the seven symbols, or the second symbol set includes the fifth symbol and the sixth symbol in the seven symbols.

With reference to the first aspect or the first possible implementation of the first aspect, in a second possible implementation of the first aspect, before the receiving, by a network device, a first reference signal and a first physical channel that are sent by a first terminal device, the method further includes:

sending, by the network device, first downlink control information to the first terminal device, where the first downlink control information includes configuration information used to indicate the first reference signal.

With reference to any one of the first aspect to the second possible implementation of the first aspect, in a third possible implementation of the first aspect, the first reference signal occupies contiguous subcarriers in a frequency domain, and a quantity of subcarriers occupied by the first reference signal is greater than or equal to a quantity of subcarriers occupied by the first physical channel; or the first reference signal occupies odd-numbered subcarriers or even-numbered subcarriers in a frequency domain, and twice a quantity of subcarriers occupied by the first reference signal is greater than or equal to a quantity of subcarriers occupied by the first physical channel.

With reference to any one of the first aspect to the third possible implementation of the first aspect, in a fourth possible implementation of the first aspect, after the receiving, by a network device, a first reference signal and a first physical channel that are sent by a first terminal device, the method further includes:

receiving, by the network device, a second physical channel sent by the first terminal device, where the second physical channel occupies m symbols in the slot, m is 1, 2, or 3, and the symbol occupied by the second physical channel is different from the symbol occupied by the first physical channel; and demodulating, by the network device, the second physical channel according to the first reference signal.

With reference to the fourth possible implementation of the first aspect, in a fifth possible implementation of the first aspect, when the slot includes the seven symbols and i is 4, that the symbol occupied by the second physical channel is different from the symbol occupied by the first physical channel includes:

the first physical channel is at the first symbol set and the second physical channel is at the second symbol set, or the first physical channel is at the second symbol set and the second physical channel is at the first symbol set, where the first symbol set includes the first three of the seven symbols; and the second symbol set includes the fifth symbol, the sixth symbol, and the seventh symbol in the seven symbols, or the second symbol set includes the fifth symbol and the sixth symbol in the seven symbols.

With reference to the fourth possible implementation of the first aspect or the fifth possible implementation of the first aspect, in a sixth possible implementation of the first aspect, the first reference signal occupies the contiguous subcarriers in the frequency domain, the quantity of subcarriers occupied by the first reference signal is greater than or equal to the quantity of subcarriers occupied by the first physical channel, and the quantity of subcarriers occupied by the first reference signal is greater than or equal to a quantity of subcarriers occupied by the second physical channel; or the first reference signal occupies the even-numbered subcarriers or the odd-numbered subcarriers in the frequency domain, twice the quantity of subcarriers occupied by the first reference signal is greater than or equal to the quantity of subcarriers occupied by the first physical channel, and twice the quantity of subcarriers occupied by the first reference signal is greater than or equal to a quantity of subcarriers occupied by the second physical channel.

With reference to any one of the first aspect to the second possible implementation of the first aspect, in a seventh possible implementation of the first aspect, the method further includes:

receiving, by the network device, a second reference signal and a third physical channel that are sent by a second terminal device, where the second reference signal is at the $i^{th}$ symbol in the slot, i is the positive integer less than 7, the third physical channel occupies p symbols in the slot, and p is 1, 2, or 3; and demodulating, by the network device, the third physical channel according to the second reference signal, where the symbol occupied by the first physical channel is different from the symbol occupied by the third physical channel.

With reference to the seventh possible implementation of the first aspect, in an eighth possible implementation of the first aspect, before the receiving, by the network device, a second reference signal and a third physical channel that are sent by a second terminal device, the method further includes:

sending, by the network device, second downlink control information to the second terminal device, where the second downlink control information includes configuration information used to indicate the second reference signal.

With reference to the seventh possible implementation of the first aspect or the eighth possible implementation of the first aspect, in a ninth possible implementation of the first aspect, the first reference signal occupies odd-numbered subcarriers in a frequency domain, and the second reference signal occupies even-numbered subcarriers in the frequency domain; or the second reference signal occupies odd-numbered subcarriers in a frequency domain, and the first reference signal occupies even-numbered subcarriers in the frequency domain; or twice a quantity of subcarriers occupied by the first reference signal is greater than or equal to a quantity of subcarriers occupied by the first physical channel, and twice a quantity of subcarriers occupied by the second reference signal is greater than or equal to a quantity of subcarriers occupied by the third physical channel.

With reference to any one of the seventh possible implementation of the first aspect to the ninth possible implementation of the first aspect, in a tenth possible implementation of the first aspect, when the slot includes the seven symbols and i is 4, that the symbol occupied by the first physical channel is different from the symbol occupied by the third physical channel includes:

the first physical channel is at the first symbol set and the third physical channel is at the second symbol set, or the first physical channel is at the second symbol set and the third physical channel is at the first symbol set, where the first symbol set includes the first three of the seven symbols; and the second symbol set includes the fifth symbol, the sixth symbol, and the seventh symbol in the seven symbols, or the second symbol set includes the fifth symbol and the sixth symbol in the seven symbols.

With reference to the sixth possible implementation of the first aspect or the ninth possible implementation of the first aspect, in an eleventh possible implementation of the first aspect, the demodulating, by the network device, the first physical channel according to the first reference signal includes:

generating, by the network device, a base sequence, where a length of the base sequence is greater than or equal to the quantity of subcarriers occupied by the first physical channel;

performing, by the network device, cyclic shift on the base sequence to obtain an initial reference signal sequence;

sampling, by the network device, the initial reference signal sequence at an interval, to obtain a sequence of the first reference signal; and demodulating, by the network device, the first physical channel according to the sequence of the first reference signal.

According to a second aspect, a data transmission method is provided, including:

configuring, by a terminal device, a first reference signal and a first physical channel, where the first reference signal is at the $i^{th}$ symbol in a slot, i is a positive integer less than 7, the first physical channel occupies n symbols in the slot, and n is 1, 2, or 3; and sending, by the terminal device, the first reference signal and the first physical channel to a network device.

With reference to the second aspect, in a first possible implementation of the second aspect, the slot includes seven symbols, i is 4, and the first physical channel is at a first symbol set or a second symbol set, where the first symbol set includes the first three of the seven symbols; and the second symbol set includes the fifth symbol, the sixth symbol, and the seventh symbol in the seven symbols; or the second symbol set includes the fifth symbol and the sixth symbol in the seven symbols.

With reference to the second aspect or the first possible implementation of the second aspect, in a second possible implementation of the second aspect, before the configuring, by a terminal device, a first reference signal and a first physical channel, the method further includes:

receiving, by the terminal device, first downlink control information sent by the network device, where the first downlink control information includes configuration information used to indicate the first reference signal.

With reference to any one of the second aspect to the second possible implementation of the second aspect, in a third possible implementation of the second aspect, the first reference signal occupies contiguous subcarriers, and a quantity of subcarriers occupied by the first reference signal is greater than or equal to a quantity of subcarriers occupied by the first physical channel.

With reference to any one of the second aspect to the second possible implementation of the second aspect, in a fourth possible implementation of the second aspect, the first reference signal occupies odd-numbered subcarriers or even-numbered subcarriers in a frequency domain, and twice a quantity of subcarriers occupied by the first reference signal is greater than or equal to a quantity of subcarriers occupied by the first physical channel.

With reference to the fourth possible implementation of the second aspect, in a fifth possible implementation of the second aspect, the configuring, by a terminal device, a first reference signal includes:

generating, by the terminal device, a sequence of the first reference signal; and mapping, by the terminal device, the sequence of the first reference signal to the even-numbered subcarriers or the odd-numbered subcarriers.

With reference to the fifth possible implementation of the second aspect, in a sixth possible implementation of the second aspect, the generating, by the terminal device, a sequence of the first reference signal includes:

generating, by the terminal device, a base sequence, where a length of the base sequence is greater than or equal to the quantity of subcarriers occupied by the first physical channel;

performing, by the terminal device, cyclic shift on the base sequence to obtain an initial reference signal sequence; and sampling, by the terminal device, the initial reference signal sequence at an interval, to obtain the sequence of the first reference signal.

With reference to any one of the second aspect to the sixth possible implementation of the second aspect, in a seventh possible implementation of the second aspect, if the first reference signal may be further used for demodulating a second physical channel, the method further includes:

configuring, by the terminal device, the second physical channel, where the second physical channel occupies m symbols in the slot, m is 1, 2, or 3, and the symbol occupied by the second physical channel is different from the symbol occupied by the first physical channel; and sending, by the terminal device, the second physical channel to the network device.

With reference to the seventh possible implementation of the second aspect, in an eighth possible implementation of the second aspect, when the slot includes the seven symbols and i is 4, that the symbol occupied by the second physical channel is different from the symbol occupied by the first physical channel includes:

the first physical channel is at the first symbol set and the second physical channel is at the second symbol set, or the first physical channel is at the second symbol set and the second physical channel is at the first symbol set, where the first symbol set includes the first three of the seven symbols; and the second symbol set includes the fifth symbol, the sixth symbol, and the seventh symbol in the seven symbols, or the second symbol set includes the fifth symbol and the sixth symbol in the seven symbols.

According to a third aspect, a network device is provided, where the network device includes:

a first receiving unit, configured to receive a first reference signal and a first physical channel that are sent by a first terminal device, where the first reference signal is at the $i^{th}$ symbol in a slot, i is a positive integer less than 7, the first physical channel occupies n symbols in the slot, and n is 1, 2, or 3; and a first processing unit, configured to demodulate the first physical channel according to the first reference signal.

With reference to the third aspect, in a first possible implementation of the third aspect, the slot includes seven symbols, i is 4, and the first physical channel is at a first symbol set or a second symbol set;

the first symbol set includes the first three of the seven symbols; and the second symbol set includes the fifth symbol, the sixth symbol, and the seventh symbol in the seven symbols, or the second symbol set includes the fifth symbol and the sixth symbol in the seven symbols.

With reference to the third aspect or the first possible implementation of the third aspect, in a second possible implementation of the third aspect, the device further includes a first sending unit, configured to send first downlink control information to the first terminal device before the first receiving unit receives the first reference signal and the first physical channel that are sent by the first terminal device, where the first downlink control information includes configuration information used to indicate the first reference signal.

With reference to any one of the third aspect to the second possible implementation of the third aspect, in a third possible implementation of the third aspect, the first reference signal occupies contiguous subcarriers in a frequency domain, and a quantity of subcarriers occupied by the first reference signal is greater than or equal to a quantity of subcarriers occupied by the first physical channel; or the first reference signal occupies odd-numbered subcarriers or even-numbered subcarriers in a frequency domain, and twice a quantity of subcarriers occupied by the first reference signal is greater than or equal to a quantity of subcarriers occupied by the first physical channel.

With reference to any one of the third aspect to the third possible implementation of the third aspect, in a fourth possible implementation of the third aspect, the first receiving unit is further configured to: after receiving the first reference signal and the first physical channel that are sent by the first terminal device, receive a second physical channel sent by the first terminal device, where the second physical channel occupies m symbols in the slot, m is 1, 2, or 3, and the symbol occupied by the second physical channel is different from the symbol occupied by the first physical channel; and the first processing unit is further configured to demodulate the second physical channel according to the first reference signal.

With reference to the fourth possible implementation of the third aspect, in a fifth possible implementation of the third aspect, when the slot includes the seven symbols and i is 4, that the symbol occupied by the second physical channel is different from the symbol occupied by the first physical channel includes:

the first physical channel is at the first symbol set and the second physical channel is at the second symbol set, or the first physical channel is at the second symbol set and the second physical channel is at the first symbol set, where the first symbol set includes the first three of the seven symbols; and the second symbol set includes the fifth symbol, the sixth symbol, and the seventh symbol in the seven symbols, or the second symbol set includes the fifth symbol and the sixth symbol in the seven symbols.

With reference to the fourth or the fifth possible implementation of the third aspect, in a sixth possible implementation of the third aspect, the first reference signal occupies the contiguous subcarriers in the frequency domain, the quantity of subcarriers occupied by the first reference signal is greater than or equal to the quantity of subcarriers occupied by the first physical channel, and the quantity of subcarriers occupied by the first reference signal is greater than or equal to a quantity of subcarriers occupied by the second physical channel; or the first reference signal occupies the even-numbered subcarriers or the odd-numbered subcarriers in the frequency domain, twice the quantity of subcarriers occupied by the first reference signal is greater than or equal to the quantity of subcarriers occupied by the first physical channel, and twice the quantity of subcarriers occupied by the first reference signal is greater than or equal to a quantity of subcarriers occupied by the second physical channel.

With reference to any one of the third aspect to the second possible implementation of the third aspect, in a seventh possible implementation of the third aspect, the first receiving unit is further configured to receive a second reference signal and a third physical channel that are sent by a second terminal device, where the second reference signal is at the $i^{th}$ symbol in the slot, i is the positive integer less than 7, the third physical channel occupies p symbols in the slot, and p is 1, 2, or 3; and the network device demodulates the third physical channel according to the second reference signal, where the symbol occupied by the first physical channel is different from the symbol occupied by the third physical channel.

With reference to the seventh possible implementation of the third aspect, in an eighth possible implementation of the third aspect, the first sending unit is further configured to send second downlink control information to the second terminal device before the first receiving unit receives the second reference signal and the third physical channel that are sent by the second terminal device, where the second downlink control information includes configuration information used to indicate the second reference signal.

With reference to the seventh possible implementation of the third aspect or the eighth possible implementation of the third aspect, in a ninth possible implementation of the third aspect, the first reference signal occupies odd-numbered subcarriers in a frequency domain, and the second reference signal occupies even-numbered subcarriers in the frequency domain; or the second reference signal occupies odd-numbered subcarriers in a frequency domain, and the first reference signal occupies even-numbered subcarriers in the frequency domain; or twice a quantity of subcarriers occupied by the first reference signal is greater than or equal to a quantity of subcarriers occupied by the first physical channel, and twice a quantity of subcarriers occupied by the second reference signal is greater than or equal to a quantity of subcarriers occupied by the third physical channel.

With reference to any one of the seventh possible implementation of the third aspect to the ninth possible implementation of the third aspect, in a tenth possible implementation of the third aspect, when the slot includes the seven symbols and i is 4, that the symbol occupied by the first physical channel is different from the symbol occupied by the third physical channel includes:

the first physical channel is at the first symbol set and the third physical channel is at the second symbol set, or the first physical channel is at the second symbol set and the third physical channel is at the first symbol set, where the first symbol set includes the first three of the seven symbols; and the second symbol set includes the fifth symbol, the sixth symbol, and the seventh symbol in the seven symbols, or the second symbol set includes the fifth symbol and the sixth symbol in the seven symbols.

With reference to the sixth possible implementation of the third aspect or the ninth possible implementation of the third aspect, in an eleventh possible implementation of the third aspect, the first processing unit is further configured to:

generate a base sequence, where a length of the base sequence is greater than or equal to the quantity of subcarriers occupied by the first physical channel;

perform cyclic shift on the base sequence to obtain an initial reference signal sequence;

sample the initial reference signal sequence at an interval, to obtain a sequence of the first reference signal; and demodulate the first physical channel according to the sequence of the first reference signal.

According to a fourth aspect, a terminal device is provided, where the terminal device includes:

a second processing unit, configured to configure a first reference signal and a first physical channel, where the first reference signal is at the $i^{th}$ symbol in a slot, i is a positive integer less than 7, the first physical channel occupies n symbols in the slot, and n is 1, 2, or 3; and a second sending unit, configured to send the first reference signal and the first physical channel to a network device.

With reference to the fourth aspect, in a first possible implementation of the fourth aspect, the slot includes seven symbols, i is 4, and the first physical channel is at a first symbol set or a second symbol set, where the first symbol set includes the first three of the seven symbols; and the second symbol set includes the fifth symbol, the sixth symbol, and the seventh symbol in the seven symbols; or the second symbol set includes the fifth symbol and the sixth symbol in the seven symbols.

With reference to the fourth aspect or the first possible implementation of the fourth aspect, in a second possible implementation of the fourth aspect, the device further includes a second receiving unit, configured to: before the second processing unit configures the first reference signal and the first physical channel, receive first downlink control information sent by the network device, so that the processing unit configures the first reference signal according to the first downlink control information, where the first downlink control information includes configuration information used to indicate the first reference signal.

With reference to any one of the fourth aspect or the second possible implementation of the first aspect, in a third possible implementation of the fourth aspect, the first reference signal occupies contiguous subcarriers, and a quantity of subcarriers occupied by the first reference signal is greater than or equal to a quantity of subcarriers occupied by the first physical channel.

With reference to any one of the fourth aspect or the second possible implementation of the first aspect, in a fourth possible implementation of the fourth aspect, the first reference signal occupies odd-numbered subcarriers or even-numbered subcarriers in a frequency domain, and twice a quantity of subcarriers occupied by the first reference signal is greater than or equal to a quantity of subcarriers occupied by the first physical channel.

With reference to the fourth possible implementation of the fourth aspect, in a fifth possible implementation of the fourth aspect, the second processing unit is further configured to:

generate a sequence of the first reference signal; and map the sequence of the first reference signal to the even-numbered subcarriers or the odd-numbered subcarriers.

With reference to the fifth possible implementation of the fourth aspect, in a sixth possible implementation of the fourth aspect, the second processing unit is further configured to:

generate a base sequence, where a length of the base sequence is greater than or equal to the quantity of subcarriers occupied by the first physical channel;

perform cyclic shift on the base sequence to obtain an initial reference signal sequence; and sample the initial reference signal sequence at an interval, to obtain the sequence of the first reference signal.

With reference to any one of the fourth aspect or the sixth possible implementation of the first aspect, in a seventh possible implementation of the fourth aspect, if the first reference signal is further used for demodulating a second physical channel, the second processing unit is further configured to configure the second physical channel, where the second physical channel occupies m symbols in the slot, m is 1, 2, or 3, and the symbol occupied by the second physical channel is different from the symbol occupied by the first physical channel; and the second sending unit is further configured to send the second physical channel to the network device.

With reference to the seventh possible implementation of the fourth aspect, in an eighth possible implementation of the fourth aspect, when the slot includes the seven symbols and i is 4, that the symbol occupied by the second physical channel is different from the symbol occupied by the first physical channel includes:

the first physical channel is at the first symbol set and the second physical channel is at the second symbol set, or the first physical channel is at the second symbol set and the second physical channel is at the first symbol set, where the first symbol set includes the first three of the seven symbols; and the second symbol set includes the fifth symbol, the sixth symbol, and the seventh symbol in the seven symbols, or the second symbol set includes the fifth symbol and the sixth symbol in the seven symbols.

The embodiments of the present disclosure provide the data transmission method, so as to decrease an uplink transmission TTI to three symbols or four symbols. Therefore, a transmission time interval is reduced, and for one terminal device, a quantity of times of scheduling per unit of time can be increased. Therefore, a data transmission latency can be effectively reduced. In addition, in one slot, only one symbol is used for reference signal transmission. TTI reduction does not cause an increase in reference signal overheads.

It should be understood that the foregoing general descriptions and the following detailed descriptions are merely examples, and cannot limit the protection scope of the present disclosure.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other drawings from these accompanying drawings without creative efforts.

Figure 1:
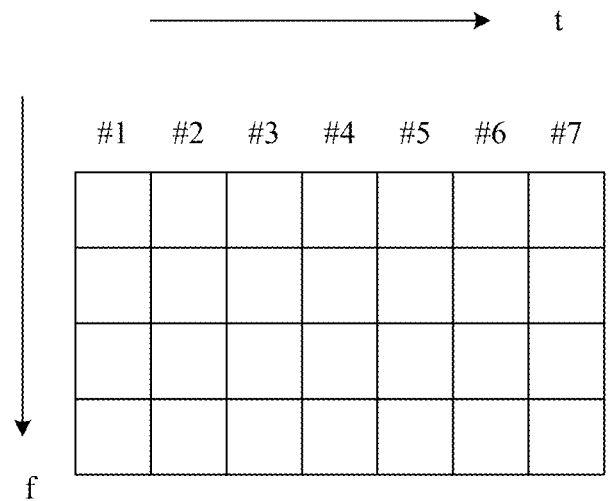
FIG. 1 is a schematic structural diagram of a common slot.

Clear embodiments of the present disclosure are shown by using the foregoing accompanying drawings, and more detailed descriptions are provided in the following. These accompanying drawings and text descriptions are not intended to limit the scope of the idea of the present disclosure in any manner, but are intended to explain, by referring to specific embodiments, the concept of the present disclosure to a person skilled in the art.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

For comprehensive understanding of the present disclosure, many specific details are mentioned in the following detailed descriptions, but a person skilled in the prior art should understand that the present disclosure may be implemented without these specific details. In another embodiment, a commonly known method, process, component, and circuit are not described in detail, to prevent embodiment ambiguity from being unnecessarily caused.

The embodiments of the present disclosure provide a data transmission method. The method may be implemented by a terminal device and a network device together. The terminal device may also be referred to as a user equipment (UE), a mobile station (MS), a mobile terminal, or the like. The terminal device may communicate with one or more core networks by using a radio access network (RAN). For example, the terminal device may be a mobile phone (also referred to as a "cellular" phone), a computer with a mobile terminal, or the like. For example, the terminal device may be a portable mobile apparatus, a pocket-sized mobile apparatus, a handheld mobile apparatus, a computer built-in mobile apparatus, or an in-vehicle mobile apparatus, where the mobile apparatus exchanges voice and/or data with the radio access network. The network device may be a base transceiver station (BTS) in GSM or CDMA, may be a NodeB (NB) in WCDMA, or may be an evolved NodeB (eNB or eNodeB) in LTE.

The technical solutions of the embodiments of the present disclosure may be applied to various communications systems, for example, a Global System for Mobile Communications (GSM) system, a Code Division Multiple Access (CDMA) system, a Wideband Code Division Multiple Access (WCDMA) system, a general packet radio service (GPRS) system, a Long Term Evolution (LTE) system, an LTE frequency division duplex (FDD) system, an LTE time division duplex (TDD) system, a Universal Mobile Telecommunications System (UMTS), and another wireless communications system to which an orthogonal frequency division multiplexing (OFDM) technology is applied.

The following briefly describes an application environment of the embodiments of the present disclosure by using an LTE system as an example. However, the application environment of the embodiments of the present disclosure is not limited to the LTE system. The solutions provided in the embodiments of the present disclosure may be used for any wireless communications system in which data transmission is performed by means of scheduling.

In the LTE system, each radio frame includes ten subframes, each of which has duration of 1 ms. Each subframe includes two slots in a time domain. For a normal cyclic prefix (normal CP), each slot includes seven symbols; that is, each slot includes symbols whose sequence numbers are {#0, #1, #2, #3, #4, #5, #6}. For an extended cyclic prefix (extended CP), each slot includes six symbols; that is, each slot includes symbols whose sequence numbers are {#0, #1, #2, #3, #4, #5}.

In one subframe, there are a plurality of subcarriers in a frequency domain. FIG. 1 is a schematic structural diagram of a slot. In FIG. 1, a horizontal direction represents a time domain, and a vertical direction represents a frequency domain. The slot shown in FIG. 1 is a slot with a normal CP. The horizontal direction is the time domain, and the vertical direction is the frequency domain. Each vertical row represents one symbol, and each horizontal row represents one subcarrier. The slot includes seven symbols in the time domain. In the frequency domain, only four subcarriers are shown as an example.

An uplink symbol is referred to as a single carrier frequency division multiple access (SC-FDMA) symbol. A downlink symbol is referred to as an orthogonal frequency division multiplexing (OFDM) symbol. If an uplink multiple access manner of orthogonal frequency division multiple access (OFDMA) is introduced into a subsequent technology, the uplink symbol may also be referred to as an OFDM symbol. In the embodiments of the present disclosure, both the uplink symbol and the downlink symbol are collectively referred to as a symbol.

A physical channel bears data information from a higher layer. In the embodiments of the present disclosure, the physical channel is a physical uplink shared channel (PUSCH) or a physical uplink control channel (PUCCH). A physical signal is used for a physical layer, and does not bear data information from a higher layer. Preferably, in the embodiments of the present disclosure, the physical signal is a reference signal (RS), for example, a used-for-uplink demodulation reference signal (DMRS) or sounding reference signal (SRS). A network device configures an RS for each physical channel, performs channel estimation according to the RS, and demodulates the physical channel according to a channel value obtained by means of estimation.

Short-TTI data transmission is data transmission whose TTI is less than one subframe or 1 ms, for example, TTI=0.5 ms, or the TTI is a length of one, two, three, or four symbols. Similarly, a data packet whose TTI is less than one subframe or 1 ms is referred to as a short-TTI data packet. In the frequency domain, short-TTI data transmission may be continuously distributed, or may be discontinuously distributed. For discontinuous distribution, short-TTI data transmission is distributed at $N_{cluster}$ subcarrier sets. The $N_{cluster}$ subcarrier sets are not contiguous. Subcarriers in each subcarrier set are contiguously distributed. Quantities of subcarriers included in any two of the $N_{cluster}$ subcarrier sets may be equal or unequal. $N_{cluster}$ is an integer greater than 1, and preferably, $N_{cluster}$ is 2. It should be noted that, one RB includes M contiguous subcarriers (for example, M=12), and therefore, the subcarrier set may also be referred to as a resource block (RB) set in the present disclosure.

The embodiments of the present disclosure provide a data configuration method. In the embodiments of the present disclosure, configured data is mainly the reference signal and the physical channel. A data transmission latency can be reduced by means of configuration of the reference signal and the physical channel.

The embodiments of the present disclosure provide three reference signal and physical channel configuration scenarios. A first configuration scenario is: One terminal device is corresponding to one reference signal, and the reference signal is used for demodulating one physical channel. A second configuration scenario is: One terminal device is corresponding to one reference signal, and the reference signal is used for demodulating two physical channels. A third configuration scenario is: Two terminal devices are respectively corresponding to two reference signals, and the two reference signals are respectively used for demodulating two physical channels corresponding to the two terminal devices.

Figure 2:
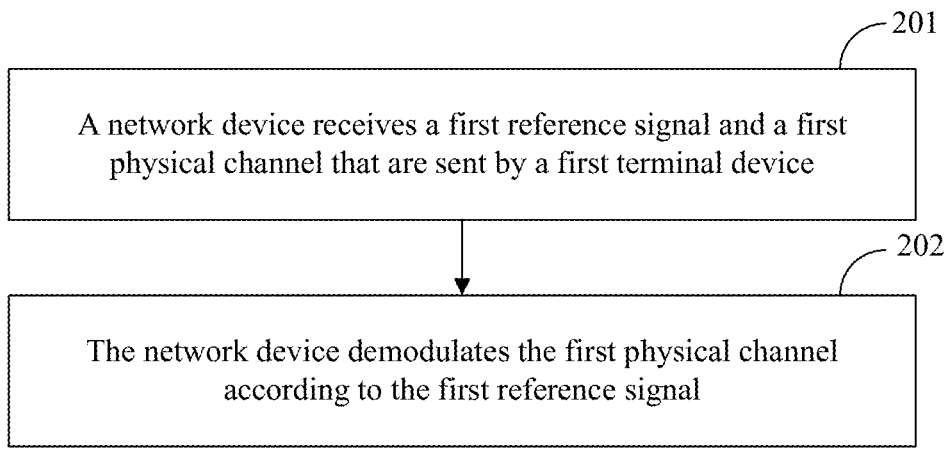
FIG. 2 is a flowchart of a data transmission method according to an embodiment of the present disclosure.

FIG. 2 is a flowchart of a data transmission method according to an embodiment of the present disclosure. As shown in FIG. 2, the method is applied to a network device. The method is applied to the foregoing first configuration scenario; that is, one terminal device is corresponding to one reference signal used for demodulating one physical channel. The method includes the following steps.

Step 201: The network device receives a first reference signal and a first physical channel that are sent by a first terminal device.

The first reference signal is at the $i^{th}$ symbol in a slot, and i is a positive integer less than 7. The first physical channel occupies n symbols in the slot, and n is 1, 2, or 3.

Preferably, the first physical channel is a PUSCH, and the first reference signal is an RS corresponding to the PUSCH. The RS may be used as a PUSCH DMRS and/or SRS.

Optionally, the first physical channel is a PUCCH, and the first reference signal is an RS corresponding to the PUCCH. The RS may be used as a PUCCH DMRS and/or SRS.

In this embodiment of the present disclosure, preferably, for a normal CP, the first reference signal is at the fourth symbol (that is, i=4, and the reference signal is at the symbol whose sequence number is #3 in the slot). The first physical channel is at a first symbol set or a second symbol set.

The first symbol set includes the first three of seven symbols in the slot. In other words, the first symbol set includes three symbols whose sequence numbers are #0, #1, and #2 in the slot.

The second symbol set includes the fifth symbol, the sixth symbol, and the seventh symbol in the seven symbols, or the second symbol set includes the fifth symbol and the sixth symbol in the seven symbols. In other words, the second symbol set includes three symbols whose sequence numbers are #4, #5, and #6 in the slot, or the second symbol set includes two symbols whose sequence numbers are #4 and #5 in the slot.

Usually, for the normal CP, the second symbol set includes three symbols in the slot. However, when the last symbol in the slot is used for SRS transmission, the second symbol set may include two symbols in the slot. For example, the second symbol set includes the fifth symbol and the sixth symbol. "The last symbol in the slot is used for SRS transmission" includes at least one of the following four conditions:

Condition 1: The terminal device transmits an SRS at the last symbol in the slot, and the SRS and the physical channel exist in a same serving cell.

Condition 2: The slot is the second slot in a cell-specific subframe used for SRS transmission, and bandwidth occupied by the physical channel and bandwidth occupied by a cell-specific SRS overlap partly or completely.

Condition 3: The slot is the second slot in an aperiodic SRS subframe that is specific to the terminal device, and the terminal device possibly transmits an SRS at the last symbol in the slot in a serving cell in which the physical channel exists.

Condition 4: When a plurality of timing advance groups (TAG) are configured for the terminal device, the slot is the second slot in a periodic SRS subframe that is specific to the terminal device, and the terminal device may transmit an SRS at the last symbol in the slot in a serving cell in which the physical channel exists.

Certainly, the four conditions are merely examples used in the present disclosure. The present disclosure includes but is not limited to the four conditions.

The method in this embodiment of the present disclosure may be further applied to an extended CP. For the extended CP, one slot includes six symbols in a time domain. Preferably, the first reference signal may be at the third symbol (that is, i=3, and the reference signal is at the symbol whose sequence number is #2 in the slot). The first physical channel is at a first symbol set or a second symbol set.

In this case, the first symbol set includes the first two of the six symbols. In other words, the first symbol set includes two symbols whose sequence numbers are #0 and #1 in the slot.

The second symbol set includes the fourth symbol, the fifth symbol, and the sixth symbol in the six symbols, or the second symbol set includes the fourth symbol and the fifth symbol in the six symbols. In other words, the second symbol set includes three symbols whose sequence numbers are #3, #4, and #5 in the slot, or the second symbol set includes two symbols whose sequence numbers are #3 and #4 in the slot.

Usually, for the extended CP, the second symbol set includes three symbols in the slot. When the last symbol in the slot is used for SRS transmission, the second symbol set may include two symbols in the slot. For example, the second symbol set includes the fourth symbol and the fifth symbol. "The last symbol in the slot is used for SRS transmission" includes a condition described above, and details are not described herein again.

In this embodiment of the present disclosure, optionally, the first reference signal is one of the following three types of reference signals.

Reference signal type 1:

A quantity of subcarriers occupied by the first reference signal is greater than or equal to a quantity of subcarriers occupied by the first physical channel, that is, $M_{sc}^{RS}=M_{sc}^{CH}$ or $M_{sc}^{RS}>M_{sc}^{CH}$, where $M_{sc}^{RS}$ is a sequence length of the first reference signal, and $M_{sc}^{CH}$ is the quantity of subcarriers occupied by the first physical channel. The first reference signal occupies contiguous subcarriers in a frequency domain. Alternatively, the first reference signal occupies non-contiguous $N_{cluster}$ subcarrier sets in a frequency domain (for details, refer to the foregoing descriptions), and occupies contiguous subcarriers in each subcarrier set. Further, the subcarriers occupied by the first reference signal include all of the subcarriers occupied by the first physical channel. That is, all of the subcarriers occupied by the first physical channel are a part or all of the subcarriers occupied by the first reference signal. Therefore, the first reference signal can not only be used for physical-channel demodulation, but also be used for channel quality detection. That is, the first reference signal can not only be used as a DMRS, but also be used as an SRS.

A sequence of the first reference signal is generated by performing cyclic shift on a base sequence. That is, $r_{u,v}^{(\alpha)}(n)=e^{j\alpha n}\bar{r}_{u,v}(n)$, where $0 \leq n < M_{sc}^{RS}$, $r_{u,v}^{(\alpha)}(n)$ is the sequence of the first reference signal, $\bar{r}_{u,v}(n)$ is the base sequence, α is cyclic shift, $M_{sc}^{RS}$ is the sequence length of the first reference signal, u is a group number, and v is a base sequence number in a group.

When $M_{sc}^{RS}$ is 12 or 24, the base sequence is a special sequence that is based on quadrature phase shift keying (QPSK) and that is found by using a computer.

When $M_{sc}^{RS}$ is greater than or equal to 36, preferably, the base sequence is a sequence generated by performing cyclic extension on a Zadoff-Chu (ZC) sequence whose length is $N_{ZC}^{RS}$, where $N_{ZC}^{RS}$ is a maximum prime number that is not greater than $M_{sc}^{RS}$. For example, when $M_{SC}=48$, a maximum prime number that is not greater than 48 is 47, that is, $N_{ZC}^{RS}=47$. That is, an RS sequence whose $M_{sc}^{RS}$ is 48 is obtained by performing cyclic extension on a ZC sequence whose length is 47. Specifically, the base sequence is generated according to the following Formula 1.

$$\bar{r}_{u,v}(n) = x_q(n \bmod N_{ZC}^{RS}), \quad 0 \leq n < M_{sc}^{RS} \quad \text{(Formula 1)}$$

$$x_q(m) = e^{-j\frac{\pi qm(m+1)}{N_{ZC}^{RS}}}, \quad 0 \leq m \leq N_{ZC}^{RS}-1$$

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31$$

When $M_{sc}^{RS}$ is greater than or equal to 36, optionally, the base sequence is a ZC sequence, or a sequence generated by truncating a ZC sequence whose length is $N_{ZC}^{RS}$, where $N_{ZC}^{RS}$ is a minimum prime number that is not less than $M_{sc}^{RS}$.

Figure 3:
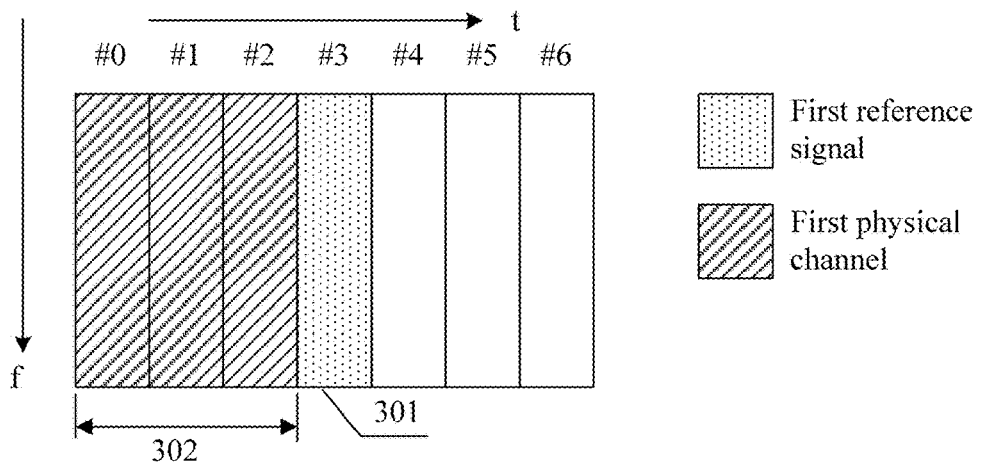
FIG. 3 is a schematic diagram of a reference signal and a physical channel in a normal CP according to an embodiment of the present disclosure.

FIG. 3 is a schematic diagram of a reference signal and a physical channel in a normal CP according to an embodiment of the present disclosure. As shown in FIG. 3, a horizontal direction is a time domain, and a vertical direction is a frequency domain. The reference signal 301 occupies the fourth symbol, and the reference signal 301 occupies contiguous subcarriers. The physical channel is at a first symbol set 302, and the first symbol set occupies the first to the third symbols. The physical channel also occupies contiguous subcarriers.

Reference signal type 2:

There are (k−1) subcarriers between any two adjacent subcarriers in all subcarriers occupied by the first reference signal in a frequency domain, and k times a quantity of subcarriers occupied by the first reference signal is greater than or equal to a quantity of subcarriers occupied by the first physical channel, where k is an integer greater than 1.

For example, the first reference signal occupies even-numbered subcarriers or odd-numbered subcarriers in the frequency domain, and twice the quantity of subcarriers occupied by the first reference signal is greater than or equal to the quantity of subcarriers occupied by the first physical channel. That is, $2M_{sc}^{RS}=M_{sc}^{CH}$ or $2M_{sc}^{RS}>M_{sc}^{CH}$, where $M_{sc}^{RS}$ is a sequence length of the first reference signal, and $M_{sc}^{CH}$ is the quantity of subcarriers occupied by the first physical channel. Further, an RB occupied by the first reference signal includes all RBs occupied by the first physical channel. That is, all the RBs occupied by the first physical channel are a part or all of RBs occupied by the first reference signal. Therefore, the first reference signal can not only be used for physical-channel demodulation, but also be used for channel quality detection. That is, the first reference signal can not only be used as a DMRS, but also be used as an SRS. It should be noted that, an RB is considered as being occupied by the first reference signal, provided that at least one subcarrier in the RB is occupied by the first reference signal.

When the first reference signal occupies the even-numbered subcarriers or the odd-numbered subcarriers in the frequency domain, a sequence of the first reference signal may be generated according to either of the following two methods.

A first method for generating the reference signal sequence is as follows:

The sequence of the first reference signal is a sequence obtained by sampling an initial RS sequence.

The initial RS sequence may be generated by performing cyclic shift on a base sequence. A generation method of the initial RS sequence is the same as a method for generating the sequence of the first reference signal of the reference signal type 1, and details are not described herein again. A length of the initial RS sequence is greater than or equal to the quantity $M_{sc}^{CH}$ of subcarriers occupied by the physical channel.

The sequence of the first reference signal is a sequence obtained by discontinuously sampling the initial RS sequence. Preferably, the sequence $RS_{u,v}^{(\alpha)}(m)$ of the first reference signal is a sequence obtained by sampling the initial RS sequence $r_{u,v}^{(\alpha)}(n)$ at an interval, that is, $RS_{u,v}^{(\alpha)}(m)=r_{u,v}^{(\alpha)}(2m+a)$, where $0 \leq m < M_{sc}^{RS}$, $M_{sc}^{RS}$ is the sequence length of the first reference signal, $2M_{sc}^{RS}$ is the length of the initial RS sequence, and a=0 or a=1.

In the foregoing first method, the RS sequence obtained by sampling the initial RS sequence at an interval still keeps a ZC sequence feature relatively well, for example, a low cubic metric (CM) feature and a low correlation feature. In addition, when an RS in a first cell is mapped to contiguous subcarriers (for data transmission with a TTI of 1 ms) and an RS in a second cell is mapped to spaced subcarriers (for data transmission with a short TTI), even if the RS in the first cell and the RS in the second cell overlap partly or completely, a relatively low correlation can be obtained between the two RSs.

A second method for generating the reference signal sequence is as follows:

The RS sequence is generated by performing cyclic shift on a base sequence.

Specifically, $r_{u,v}^{(\alpha)}(n)=e^{j\alpha n}\bar{r}_{u,v}(n)$, where $0 \leq n < M_{sc}^{RS}$, $r_{u,v}^{(\alpha)}(n)$ is the sequence of the first reference signal, $\bar{r}_{u,v}(n)$ is the base sequence, $\alpha$ is cyclic shift, and $M_{sc}^{RS}$ is the sequence length of the first reference signal. When $M_{sc}^{RS}$ is 12 or 24, the base sequence is a special sequence that is based on QPSK and that is found by using a computer. When $M_{sc}^{RS}$ is greater than or equal to 36, the base sequence is generated according to Formula 1 (as described above), or the base sequence is generated according to the following Formula 2.

$$\bar{r}_{u,v}(n) = x_q(n \bmod N_{ZC}^{RS}), 0 \leq n < M_{sc}^{RS} \quad \text{(Formula 2)}$$

$$x_p(m) = e^{-j\frac{\pi pm(m+1)}{N_{ZC}^{RS}}}, 0 \leq m \leq N_{ZC}^{RS} - 1$$

p=F(q), where

F(q) represents a function, and an input parameter of the function is q, for example, F(q)=4q.

Figure 4:
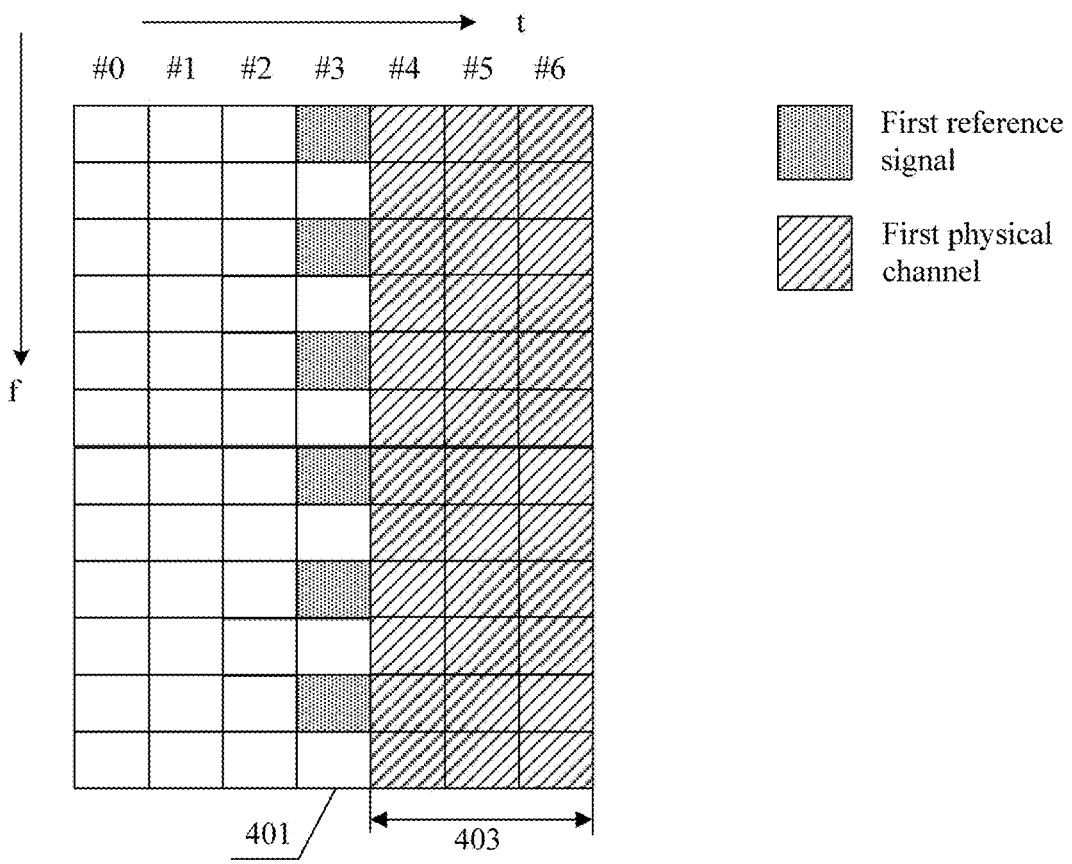
FIG. 4 is a schematic diagram of a first reference signal and a first physical channel in a normal CP according to an embodiment of the present disclosure.

FIG. 4 is a schematic diagram of a first reference signal and a first physical channel in a normal CP according to an embodiment of the present disclosure. As shown in FIG. 4, a horizontal direction is a time domain, a vertical direction is a frequency domain, each vertical row represents one symbol, and each horizontal row represents one subcarrier. The first reference signal 401 occupies the fourth symbol in the time domain, and the first reference signal 401 occupies even-numbered subcarriers in the frequency domain. The first physical channel is at a second symbol set 403. The second symbol set 403 occupies the fifth to the seventh symbols. The first physical channel occupies contiguous subcarriers. In FIG. 4, the first reference signal 401 occupies six subcarriers, and the first physical channel occupies 12 subcarriers. Twice a quantity of the subcarriers occupied by the first reference signal 401 is 12, and is equal to a quantity of the subcarriers occupied by the first physical channel.

Reference signal type 3:

A quantity of transmission units occupied by the first reference signal in a frequency domain is greater than or equal to a quantity of transmission units occupied by the first physical channel. Each transmission unit occupies $M_{sc}^{TU}$ contiguous subcarriers, and $M_{sc}^{TU}$ is an integer greater than or equal to 12. For example, $M_{sc}^{TU}=12 \times k$, where k is a positive integer. That is, $N_{RS}=N_{CH}$ or $N_{RS}>N_{CH}$, where $N_{RS}$ is the quantity of transmission units occupied by the first reference signal, and $N_{CH}$ is the quantity of transmission units occupied by the first physical channel. The first reference signal occupies contiguous transmission units in the frequency domain, or the first reference signal occupies non-contiguous transmission units in the frequency domain. Further, the transmission units occupied by the first reference signal include all the transmission units occupied by the first physical channel. That is, all the transmission units occupied by the first physical channel are a part or all of the transmission units occupied by the first reference signal. Therefore, the first reference signal can not only be used for physical-channel demodulation, but also be used for channel quality detection.

The sequence of the first reference signal is generated by cascading $N_{RS}$ unit sequences. A unit sequence i is generated by performing cyclic shift on a base sequence. That is, $r_{u,v}^{(\alpha_i)}(n)=e^{j\alpha_i n}\bar{r}_{u,v}^{i}(n)$, where $0 \leq i < N_{RS}$, $0 \leq n < M_{sc}^{RS,i}$, $r_{u,v}^{(\alpha_i)}(n)$ is the unit sequence i, $\bar{r}_{u,v}^{i}(n)$ is the base sequence of the unit sequence i, $\alpha_i$ is cyclic shift of the unit sequence i, and $M_{sc}^{RS,i}$ is a length of the unit sequence i. A generation method of the unit sequence i is the same as a method for generating the sequence of the first reference signal of the reference signal type 1, and details are not described herein again. Preferably, for the $N_{RS}$ unit sequences, a same base sequence is used, and different or same cyclic shift is performed.

Before step 201, that is, before the network device receives the first reference signal and the first physical channel that are sent by the first terminal device, the method further includes:

The network device sends first downlink control information (DCI) to the first terminal device, where the first downlink control information includes configuration information used to indicate the first reference signal. The configuration information of the first reference signal includes at least one of the following information:

a transmission comb of the reference signal, a sequence length of the reference signal, cyclic shift of the reference signal, a type of the reference signal. Preferably, the DCI includes 1-bit information used to indicate the transmission comb of the RS. For example, "0" indicates even-numbered subcarriers, and "1" indicates odd-numbered subcarriers. Alternatively, "1" indicates even-numbered subcarriers, and "0" indicates odd-numbered subcarriers. Preferably, the DCI includes one bit used to indicate the type of the RS. For example, "0" indicates that the RS is used as a DMRS, and "1" indicates that the RS is used as a DMRS and an SRS. Alternatively, "1" indicates that the RS is used as a DMRS, and "0" indicates that the RS is used as a DMRS and an SRS. Optionally, the DCI includes two bits used to indicate the type of the RS, where one status indicates that the RS is used as a DMRS, another status indicates that the RS is used as an SRS, and still another status indicates that the RS is used as a DMRS and an SRS. It should be noted that the RS in this paragraph denotes the first reference signal.

Step 202: The network device demodulates the first physical channel according to the first reference signal.

Demodulation is a process of restoring information from a modulated signal that carries information. In step 202, demodulation is a process of restoring, by the network device, information from the received first physical channel. If the first physical channel is a PUSCH, restored information is information carried by the PUSCH, for example, data information included in an uplink shared channel (UL-SCH), and/or HARQ-ACK information, and/or channel state information (CSI). If the first physical channel is a PUCCH, restored information is information carried by the PUCCH, for example, HARQ-ACK information and/or channel state information (CSI). The HARQ-ACK information may be used to indicate a reception status of downlink data, and may also be referred to as HARQ-ACK feedback information, including an ACK, a NACK, or discontinuous transmission (DTX).

Specifically, the network device demodulates the first physical channel according to the first reference signal. That is, the network device demodulates the received first physical channel according to the first reference signal, where the received first physical channel is the first physical channel that is sent by the terminal device and that is received by the network device. The received first physical channel sent by the terminal device may be distorted due to impact of a radio channel, for example, shadow fading and frequency selective fading. If the network device directly demodulates the received first physical channel without using any correction technology, there is a relatively large probability that a demodulation result is incorrect. To accurately restore the first physical channel sent by the terminal device, the network device needs to estimate the radio channel (that is, perform channel estimation), and then demodulate the received first physical channel according to a channel estimate. In the present disclosure, channel estimation is channel estimation based on a reference signal, that is, the network device performs channel estimation based on the first reference signal. Therefore, optionally, step 202 may include: The network device generates the first reference signal, and the network device demodulates the first physical channel according to the first reference signal.

Optionally, when the first reference signal is of the reference signal type 1 in step 201, step 202 may include:

generating, by the network device, a base sequence, where a length of the base sequence is greater than or equal to the quantity of subcarriers occupied by the first physical channel;

performing, by the network device, cyclic shift on the base sequence to obtain a sequence of the first reference signal; and demodulating, by the network device, the first physical channel according to the sequence of the first reference signal.

Optionally, when the first reference signal is of the reference signal type 2 in step 201, step 202 may include:

generating, by the network device, a base sequence, where a length of the base sequence is greater than or equal to the quantity of subcarriers occupied by the first physical channel;

performing, by the network device, cyclic shift on the base sequence to obtain an initial reference signal sequence;

sampling, by the network device, the initial reference signal sequence at an interval, to obtain a sequence of the first reference signal; and demodulating, by the network device, the first physical channel according to the sequence of the first reference signal.

In this embodiment of the present disclosure, the one terminal configures the one reference signal for demodulating the one physical channel. Because the reference signal occupies one symbol and the physical channel occupies two or three symbols, an uplink transmission TTI is three symbols or four symbols. Therefore, a transmission time interval is reduced, and for one terminal device, a quantity of times of scheduling per unit of time can be increased. Therefore, a data transmission latency can be effectively reduced. In addition, in one slot, only one symbol is used for reference signal transmission. TTI reduction does not cause an increase in reference signal overheads.

An embodiment of the present disclosure provides a data transmission method, applied to a network device. In this application configuration scenario, a first terminal device is corresponding to one reference signal, and the one reference signal is used for demodulating two physical channels: a first physical channel and a second physical channel.

Figure 5:
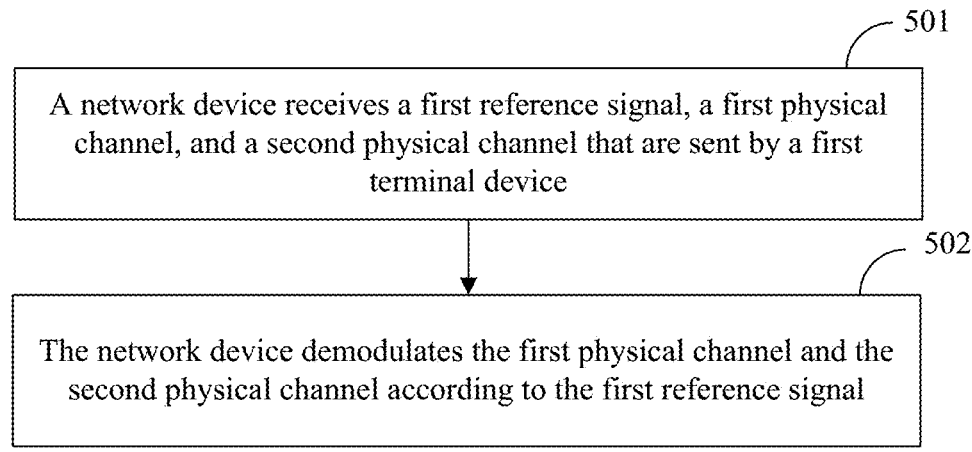
FIG. 5 is a flowchart of a data transmission method according to an embodiment of the present disclosure.

FIG. 5 is a flowchart of the data transmission method according to this embodiment of the present disclosure. As shown in FIG. 5, the method includes the following steps.

Step 501: The network device receives the first reference signal, the first physical channel, and the second physical channel that are sent by the first terminal device.

Step 502: The network device demodulates the first physical channel and the second physical channel according to the first reference signal.

In this embodiment, the first reference signal is at the $i^{th}$ symbol in a slot, and i is a positive integer less than 7. The first physical channel occupies n symbols in the slot, and n is 1, 2, or 3. The second physical channel occupies m symbols in the slot, and m is 1, 2, or 3. The symbol occupied by the second physical channel is different from the symbol occupied by the first physical channel.

For symbols in a first symbol set and a second symbol set, refer to descriptions in step 201 in the foregoing embodiment. Details are not described herein again.

Preferably, when a CP is a normal CP, if i=4, that the symbol occupied by the second physical channel is different from the symbol occupied by the first physical channel includes:

the first physical channel is at the first symbol set and the second physical channel is at the second symbol set, or the first physical channel is at the second symbol set and the second physical channel is at the first symbol set.

Similarly, preferably, when a CP is an extended CP, if i=3, that the symbol occupied by the second physical channel is different from the symbol occupied by the first physical channel includes:

the first physical channel is at the first symbol set and the second physical channel is at the second symbol set, or the first physical channel is at the second symbol set and the second physical channel is at the first symbol set.

In this embodiment, optionally, the first reference signal is one of the three types of reference signals described in step 201, and details are not described herein again. It should be noted that a relationship, between the first reference signal and the first physical channel, described in step 201 and step 202 is also applicable to the first reference signal and the second physical channel.

For example, a quantity of subcarriers occupied by the first reference signal is greater than or equal to a quantity of subcarriers occupied by the first physical channel, and the quantity of subcarriers occupied by the first reference signal is greater than or equal to a quantity of subcarriers occupied by the second physical channel.

For example, the first reference signal occupies even-numbered subcarriers or odd-numbered subcarriers, twice a quantity of subcarriers occupied by the first reference signal is greater than or equal to a quantity of subcarriers occupied by the first physical channel, and twice the quantity of subcarriers occupied by the first reference signal is greater than or equal to a quantity of subcarriers occupied by the second physical channel.

Figure 6:
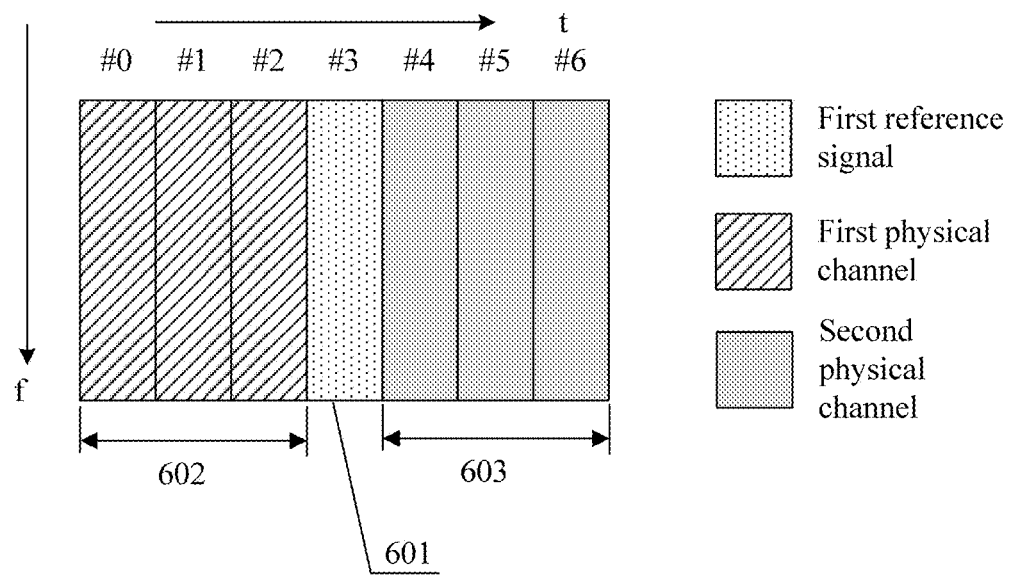
FIG. 6 is a schematic diagram of a reference signal and physical channels in a normal CP according to an embodiment of the present disclosure.

FIG. 6 is a schematic diagram of a reference signal and physical channels in a normal CP according to an embodiment of the present disclosure. As shown in FIG. 6, the reference signal 601 occupies the fourth symbol in a time domain, and occupies contiguous subcarriers in a frequency domain. A first physical channel occupies a first symbol set 602, and a second physical channel occupies a second symbol set 603.

Figure 7:
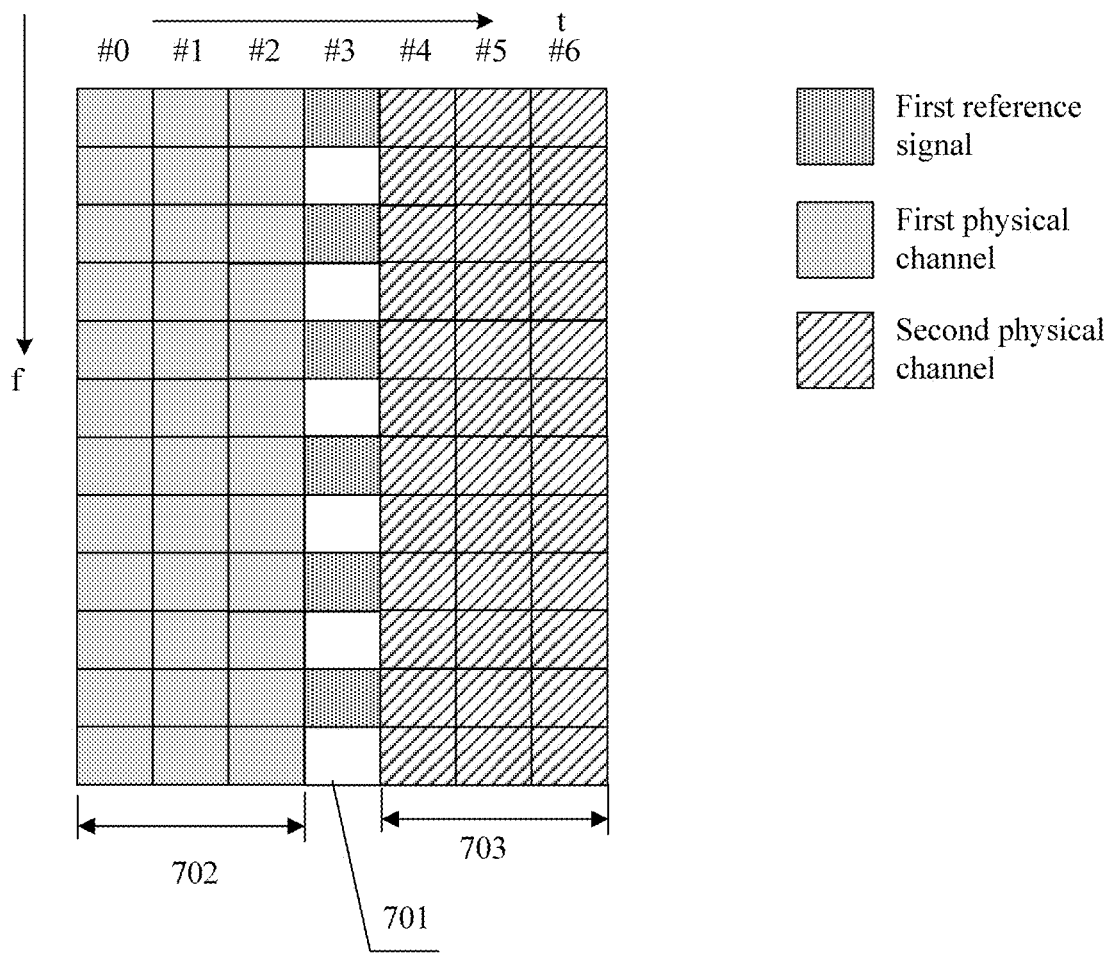
FIG. 7 is a schematic diagram of a reference signal and physical channels in a normal CP according to an embodiment of the present disclosure.

FIG. 7 is a schematic diagram of a reference signal and physical channels in a normal CP according to an embodiment of the present disclosure. As shown in FIG. 7, the reference signal 701 occupies the fourth symbol in a time domain, and occupies even-numbered subcarriers in a frequency domain, that is, occupies a total of six subcarriers. A first physical channel occupies a first symbol set 702 and 12 subcarriers, and a second physical channel occupies a second symbol set 703 and 12 subcarriers.

Before step 501, that is, before the network device receives the first reference signal, the first physical channel, and the second physical channel that are sent by the first terminal device, the method further includes:

The network device sends first downlink control information to the first terminal device, where the first downlink control information includes configuration information used to indicate the first reference signal. For the configuration information of the first reference signal, refer to descriptions in step 201. Details are not described herein again.

In this embodiment of the present disclosure, the one terminal configures the one reference signal for demodulating the two physical channels. Because the reference signal occupies one symbol and the physical channels each occupy two or three symbols, an uplink transmission TTI is three symbols or four symbols. Therefore, a transmission time interval is reduced, and for one terminal device, a quantity of times of scheduling per unit of time can be increased. Therefore, a data transmission latency can be effectively reduced. In addition, in one slot, only one symbol is used for reference signal transmission. TTI reduction does not cause an increase in reference signal overheads.

Figure 8:
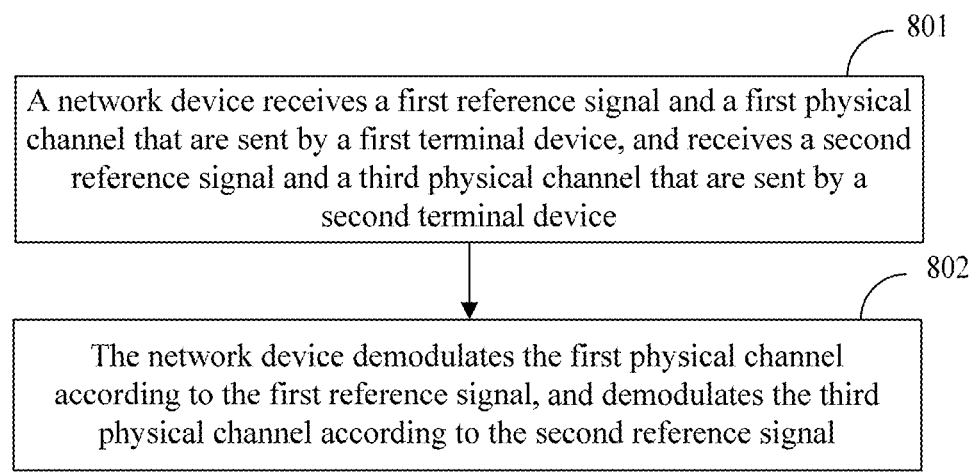
FIG. 8 is a flowchart of a data transmission method according to an embodiment of the present disclosure.

FIG. 8 is a flowchart of a data transmission method according to an embodiment of the present disclosure. The method is applied to a network device. In this embodiment, the network device can separately communicate with two terminal devices. The two terminal devices are corresponding to two reference signals, respectively. The two reference signals are a first reference signal and a second reference signal. The first reference signal is used for demodulating a first physical channel, and the second reference signal is used for demodulating a third physical channel.

Step 801: The network device receives the first reference signal and the first physical channel that are sent by a first terminal device, and receives the second reference signal and the third physical channel that are sent by a second terminal device.

Step 802: The network device demodulates the first physical channel according to the first reference signal, and demodulates the third physical channel according to the second reference signal.

In this embodiment, both the first reference signal and the second reference signal are at the $i^{th}$ symbol in a slot, and i is a positive integer less than 7. That is, the first reference signal and the second reference signal are at the same symbol. The first physical channel occupies n symbols in the slot, and n is 1, 2, or 3. The third physical channel occupies p symbols in the slot, and p is 1, 2, or 3. The symbol occupied by the third physical channel is different from the symbol occupied by the first physical channel.

Preferably, that the symbol occupied by the third physical channel is different from the symbol occupied by the first physical channel includes:

the first physical channel is at a first symbol set and the third physical channel is at a second symbol set, or the first physical channel is at a second symbol set and the third physical channel is at a first symbol set. For symbols in the first symbol set and the second symbol set, refer to descriptions in step 201 in the foregoing embodiment. Details are not described herein again.

In this embodiment of the present disclosure, optionally, the first physical channel and the third physical channel completely or partly overlap in a frequency domain.

In this embodiment, optionally, the first reference signal is one of the three types of reference signals described in step 201, and details are not described herein again. The second reference signal is one of the three types of reference signals described in step 201 (provided that the first reference signal is replaced by the second reference signal), and details are not described herein again. It should be noted that a relationship, between the first reference signal and the first physical channel, described in step 20 and step 202 is also applicable to the second reference signal and the third physical channel. That is, "the first reference signal" in step

201 is replaced by "the second reference signal", and "the first physical channel" in step 201 is replaced by "the third physical channel".

Optionally, the first reference signal and the second reference signal are of the reference signal type 1. Specifically, the first reference signal and the second reference signal occupy a same symbol and a same subcarrier. For the first RS and the second RS, a same base sequence is used, but cyclic shift is performed in different manners. The first RS and the second RS exist in one cell, or exist in two cells that support uplink CoMP. There is relatively good orthogonality between two sequences obtained by performing cyclic shift on a same base sequence. Therefore, the network device can ensure physical-channel demodulation performance or channel quality detection performance.

Optionally, the first reference signal and the second reference signal are of the reference signal type 2. Specifically, the first reference signal and the second reference signal occupy a same symbol, but occupy different subcarriers. Preferably, the first reference signal and the second reference signal use different transmission combs, that is, the terminal device configures the first RS and the second RS to use different transmission combs. Optionally, the transmission comb indicates even-numbered subcarriers or odd-numbered subcarriers. For example, the first RS is corresponding to the even-numbered subcarriers, and the second RS is corresponding to the odd-numbered subcarriers. Alternatively, the first RS is corresponding to the odd-numbered subcarriers, and the second RS is corresponding to the even-numbered subcarriers. It should be noted that, because the first RS and the second RS are at different subcarriers, sequence lengths of the first RS and the second RS may be different. Compared with the reference signal type 1, the reference signal type 2 is more flexible, and lengths of the first RS and the second RS do not need to be strictly limited to be the same.

Figure 9:
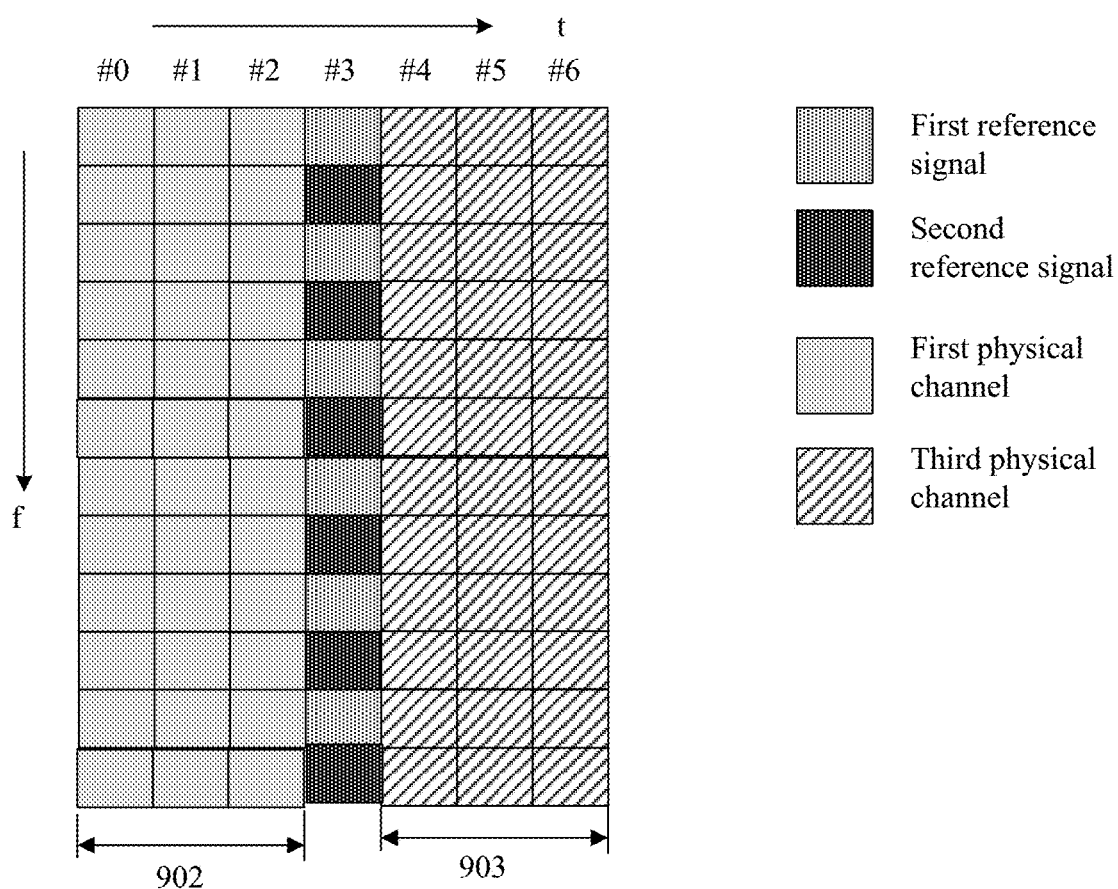
FIG. 9 is a schematic diagram of reference signals and physical channels in a normal CP according to an embodiment of the present disclosure.

FIG. 9 is a schematic diagram of reference signals and physical channels in a normal CP according to an embodiment of the present disclosure. As shown in FIG. 9, a first reference signal occupies the fourth symbol in a time domain, and occupies even-numbered subcarriers in a frequency domain. A first physical channel occupies a first symbol set 902 in the time domain. A second reference signal occupies the fourth symbol in the time domain, and occupies odd-numbered subcarriers in the frequency domain. A third physical channel occupies a second symbol set 903 in the time domain.

Optionally, the first reference signal and the second reference signal are of the reference signal type 3. Specifically, the first reference signal and the second reference signal occupy a same symbol in a time domain, and occupy, in a frequency domain, transmission units that are completely or partly the same. The first RS and the second RS exist in one cell, or exist in two cells that support uplink CoMP. For the transmission units that are completely or partly the same, for a unit sequence corresponding to the first reference signal and a unit sequence corresponding to the second reference signal, a same base sequence is used, and cyclic shift is performed in different manners. There is relatively good orthogonality between two sequences obtained by performing cyclic shift on a same base sequence. Therefore, the network device can ensure physical-channel demodulation performance or channel quality detection performance. For the reference signal type 3, lengths of the first RS and the second RS do not need to be strictly limited to be the same. Therefore, the RS type 3 is more flexible compared with an RS type 1. However, when an RS includes at least two unit sequences, a CM increases, affecting terminal power amplifier efficiency.

Before step 801, that is, before the network device receives the first reference signal and the first physical channel that are sent by the first terminal device, and receives the second reference signal and the third physical channel that are sent by the second terminal device, the method further includes:

The network device sends first downlink control information to the first terminal device, and sends second downlink control information to the second terminal device, where the first downlink control information includes configuration information used to indicate the first reference signal, and the second downlink control information includes configuration information used to indicate the second reference signal. For the configuration information of the first reference signal and the configuration information of the second reference signal, refer to descriptions in step 201. Details are not described herein again.

In this embodiment of the present disclosure, the two terminal devices communicating with the one network device send the two reference signals and the two physical channels. The two reference signals are used for demodulating the two physical channels, respectively. The two reference signals of the two terminals occupy only one symbol, and the two physical channels each occupy two or three symbols. Therefore, an uplink transmission TTI is three symbols or four symbols. Therefore, a transmission time interval is reduced, and for one terminal device, a quantity of times of scheduling per unit of time can be increased. Therefore, a data transmission latency can be effectively reduced. In addition, in one slot, only one symbol is used for reference signal transmission. TTI reduction does not cause an increase in reference signal overheads.

Figure 10:
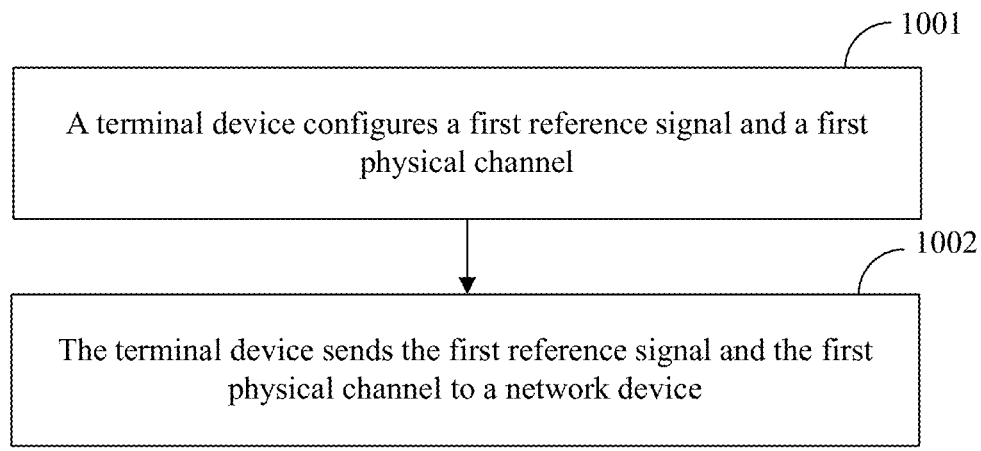
FIG. 10 is a flowchart of a data transmission method according to an embodiment of the present disclosure.

Corresponding to the foregoing data transmission method applied to the network device, an embodiment of the present disclosure further discloses a data transmission method, applied to a terminal device. As shown in FIG. 10, the method includes the following steps.

Step 1001: The terminal device configures a first reference signal and a first physical channel.

The first reference signal is at the $i^{th}$ symbol in a slot, and i is a positive integer less than 7. The first physical channel occupies n symbols in the slot, and n is 1, 2, or 3.

Further, in step 1001, that the terminal device configures a first reference signal may include: The terminal device configures the first reference signal according to configuration information of the first reference signal.

Step 1002: The terminal device sends the first reference signal and the first physical channel to a network device.

Preferably, the first physical channel is a PUSCH, and the first reference signal is an RS corresponding to the PUSCH. The RS may be used as a PUSCH DMRS and/or SRS.

Optionally, the first physical channel is a PUCCH, and the first reference signal is an RS corresponding to the PUCCH. The RS may be used as a PUCCH DMRS and/or SRS.

In this embodiment of the present disclosure, preferably, for a normal CP, the first reference signal is at the fourth symbol (that is, i=4, and the reference signal is at the symbol whose sequence number is #3 in the slot). The first physical channel is at a first symbol set or a second symbol set. For an extended CP, preferably, the first reference signal may be at the third symbol (that is, i=3, and the reference signal is at the symbol whose sequence number is #2 in the slot). The first physical channel is at a first symbol set or a second symbol set.

Optionally, for the first symbol set and the second symbol set, refer to descriptions in step 201 in the foregoing embodiment. Details are not described herein again.

Optionally, before step 1001, that is, before the terminal device configures the first reference signal and the first physical channel, the method further includes:

The terminal device receives first downlink control information sent by the network device, where the first downlink control information includes configuration information used to indicate the first reference signal. For specific configuration information, refer to descriptions in step 201. Details are not described herein again.

In this embodiment, optionally, the first reference signal is one of the three types of reference signals described in step 201, and details are not described herein again.

Optionally, the first reference signal occupies contiguous subcarriers, and a quantity of subcarriers occupied by the first reference signal is greater than or equal to a quantity of subcarriers occupied by the first physical channel.

Optionally, the first reference signal occupies even-numbered subcarriers or odd-numbered subcarriers, and twice a quantity of subcarriers occupied by the first reference signal is greater than or equal to a quantity of subcarriers occupied by the first physical channel. Correspondingly, that the terminal device configures a first reference signal includes:

generating, by the terminal device, a sequence of the first reference signal; and mapping, by the terminal device, the sequence of the first reference signal to the even-numbered subcarriers or the odd-numbered subcarriers.

Optionally, the generating, by the terminal device, a sequence of the first reference signal includes:

generating, by the terminal device, a base sequence, where a length of the base sequence is greater than or equal to the quantity of subcarriers occupied by the first physical channel;

performing, by the terminal device, cyclic shift on the base sequence to obtain an initial reference signal sequence; and sampling, by the terminal device, the initial reference signal sequence at an interval, to obtain the sequence of the first reference signal.

In this embodiment of the present disclosure, the one terminal configures the one reference signal for the network device to demodulate the one physical channel. Because the reference signal occupies one symbol and the physical channel occupies two or three symbols, an uplink transmission TTI is three symbols or four symbols. Therefore, a transmission time interval is reduced. For one terminal device, a quantity of times of scheduling per unit of time can be increased. Therefore, a data transmission latency can be effectively reduced. In addition, in one slot, only one symbol is used for reference signal transmission. TTI reduction does not cause an increase in reference signal overheads.

In the embodiment shown in FIG. 10, one reference signal is used for demodulating one physical channel. In actual application, one reference signal may be used for demodulating two physical channels, that is, may be used for demodulating the first physical channel and a second physical channel.

If the first reference signal is further used for demodulating the second physical channel, the method further includes:

configuring, by the terminal device, the second physical channel, where the second physical channel occupies m symbols in the slot, m is 1, 2, or 3, and the symbol occupied by the second physical channel is different from the symbol occupied by the first physical channel; and sending, by the terminal device, the second physical channel to the network device.

Optionally, for a normal CP, i is 4. Optionally, for an extended CP, i is 3. That the symbol occupied by the second physical channel is different from the symbol occupied by the first physical channel includes:

The first physical channel is at the first symbol set and the second physical channel is at the second symbol set, or the first physical channel is at the second symbol set and the second physical channel is at the first symbol set. For symbols in the first symbol set and the second symbol set, refer to descriptions in step 201 in the foregoing embodiment. Details are not described herein again.

In this embodiment, optionally, the first reference signal is one of the three types of reference signals described in step 201, and details are not described herein again. It should be noted that a relationship, between the first reference signal and the first physical channel, described in step 201 and step 202 is also applicable to the first reference signal and the second physical channel.

For example, the quantity of subcarriers occupied by the first reference signal is greater than or equal to the quantity of subcarriers occupied by the first physical channel, and the quantity of subcarriers occupied by the first reference signal is greater than or equal to a quantity of subcarriers occupied by the second physical channel.

For example, the first reference signal occupies the even-numbered subcarriers or the odd-numbered subcarriers, twice the quantity of subcarriers occupied by the first reference signal is greater than or equal to the quantity of subcarriers occupied by the first physical channel, and twice the quantity of subcarriers occupied by the first reference signal is greater than or equal to a quantity of subcarriers occupied by the second physical channel.

In this embodiment of the present disclosure, the one terminal configures the one reference signal for demodulating the two physical channels. Because the reference signal occupies one symbol and the physical channels each occupy two or three symbols, an uplink transmission TTI is three symbols or four symbols. Therefore, a transmission time interval is reduced, and for one terminal device, a quantity of times of scheduling per unit of time can be increased. Therefore, a data transmission latency can be effectively reduced. In addition, in one slot, only one symbol is used for reference signal transmission. TTI reduction does not cause an increase in reference signal overheads.

Figure 11:
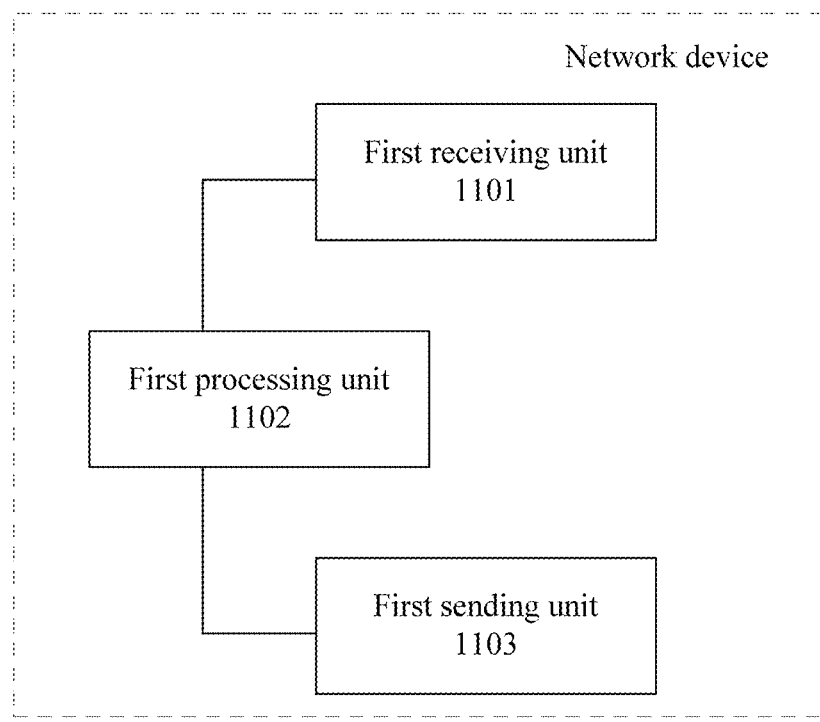
FIG. 11 is a schematic diagram of a network device according to an embodiment of the present disclosure.

Corresponding to the foregoing data transmission method, an embodiment of the present disclosure further provides a network device. The network device in this embodiment of the present disclosure can perform the foregoing data transmission method applied to a network device. FIG. 11 is a schematic diagram of the network device according to this embodiment of the present disclosure. The network device may communicate with a plurality of terminal devices. As shown in FIG. 11, the network device includes a first receiving unit 1101, a first processing unit 1102, and a first sending unit 1103.

The first receiving unit 1101 is configured to receive a first reference signal and a first physical channel that are sent by a first terminal device, where the first reference signal is at the $i^{th}$ symbol in a slot, i is a positive integer less than 7, the first physical channel occupies n symbols in the slot, and n is 1, 2, or 3.

The first processing unit 1102 is configured to demodulate the first physical channel according to the first reference signal.

Preferably, the first physical channel is a PUSCH, and the first reference signal is an RS corresponding to the PUSCH. The RS may be used as a PUSCH DMRS and/or SRS.

Optionally, the first physical channel is a PUCCH, and the first reference signal is an RS corresponding to the PUCCH. The RS may be used as a PUCCH DMRS and/or SRS.

In this embodiment of the present disclosure, preferably, for a normal CP, the first reference signal is at the fourth symbol (that is, i=4, and the reference signal is at the symbol whose sequence number is #3 in the slot). The first physical channel is at a first symbol set or a second symbol set. For an extended CP, preferably, the first reference signal may be at the third symbol (that is, i=3, and the reference signal is at the symbol whose sequence number is #2 in the slot). The first physical channel is at a first symbol set or a second symbol set.

Optionally, for the first symbol set and the second symbol set, refer to descriptions in step 201 in the foregoing embodiment. Details are not described herein again.

Optionally, the first sending unit 1103 is configured to send first downlink control information to the first terminal device before the first receiving unit receives the first reference signal and the first physical channel that are sent by the first terminal device, where the first downlink control information includes configuration information used to indicate the first reference signal. For specific configuration information, refer to descriptions in step 201. Details are not described herein again.

In this embodiment, optionally, the first reference signal is one of the three types of reference signals described in step 201, and details are not described herein again. It should be noted that a relationship, between the first reference signal and the first physical channel, described in step 201 and step 202 is also applicable to the first reference signal and a second physical channel.

Optionally, the first reference signal occupies contiguous subcarriers in a frequency domain, and a quantity of subcarriers occupied by the first reference signal is greater than or equal to a quantity of subcarriers occupied by the first physical channel; or optionally, the first reference signal occupies even-numbered subcarriers or odd-numbered subcarriers, and twice a quantity of subcarriers occupied by the first reference signal is greater than or equal to a quantity of subcarriers occupied by the first physical channel.

Preferably, the first receiving unit 1101 is further configured to: after receiving the first reference signal and the first physical channel that are sent by the first terminal device 1002, receive a second physical channel sent by the first terminal device 1002, where the second physical channel occupies m symbols in the slot, m is 1, 2, or 3, and the symbol occupied by the second physical channel is different from the symbol occupied by the first physical channel.

The first processing unit 1102 is further configured to demodulate the second physical channel according to the first reference signal.

Optionally, that the symbol occupied by the second physical channel is different from the symbol occupied by the first physical channel includes:

The first physical channel is at the first symbol set and the second physical channel is at the second symbol set, or the first physical channel is at the second symbol set and the second physical channel is at the first symbol set. For symbols in the first symbol set and the second symbol set, refer to descriptions in step 201 in the foregoing embodiment. Details are not described herein again.

Optionally, the first reference signal occupies the contiguous subcarriers in the frequency domain, the quantity of subcarriers occupied by the first reference signal is greater than or equal to the quantity of subcarriers occupied by the first physical channel, and the quantity of subcarriers occupied by the first reference signal is greater than or equal to a quantity of subcarriers occupied by the second physical channel; or the first reference signal occupies the even-numbered subcarriers or the odd-numbered subcarriers in the frequency domain, twice the quantity of subcarriers occupied by the first reference signal is greater than or equal to the quantity of subcarriers occupied by the first physical channel, and twice the quantity of subcarriers occupied by the first reference signal is greater than or equal to a quantity of subcarriers occupied by the second physical channel.

Optionally, the first receiving unit 1101 is further configured to receive a second reference signal and a third physical channel that are sent by a second terminal device 1003, where the second reference signal is at the $i^{th}$ symbol in the slot, i is the positive integer less than 7, the third physical channel occupies p symbols in the slot, and p is 1, 2, or 3.

The network device demodulates the third physical channel according to the second reference signal.

The symbol occupied by the first physical channel is different from the symbol occupied by the third physical channel.

Optionally, the first sending unit is further configured to send second downlink control information to the second terminal device before the first receiving unit receives the second reference signal and the third physical channel that are sent by the second terminal device, where the second downlink control information includes configuration information used to indicate the second reference signal. For the configuration information of the second reference signal, refer to descriptions in step 201. Details are not described herein again.

In this embodiment, optionally, the first reference signal is one of the three types of reference signals described in step 201, and details are not described herein again. The second reference signal is one of the three types of reference signals described in step 201 (provided that the first reference signal is replaced by the second reference signal, and disclosure content is unchanged), and details are not described herein again. It should be noted that a relationship, between the first reference signal and the first physical channel, described in step 201 and step 202 is also applicable to the second reference signal and the third physical channel. That is, "the first reference signal" in step 201 is replaced by "the second reference signal", and "the first physical channel" in step 201 is replaced by "the third physical channel".

Optionally, the first reference signal and the second reference signal are of a reference signal type 1. Specifically, the first reference signal and the second reference signal occupy a same symbol and a same subcarrier. For the first RS and the second RS, a same base sequence is used, but cyclic shift is performed in different manners.

Optionally, the first reference signal and the second reference signal are of a reference signal type 2. Specifically, the first reference signal and the second reference signal occupy a same symbol, but occupy different subcarriers. Preferably, the first reference signal and the second reference signal use different transmission combs (Transmission comb), that is, the terminal device configures the first RS and the second RS to use different transmission combs. Optionally, the transmission comb indicates even-numbered subcarriers or odd-numbered subcarriers. For example, the first RS is corresponding to the even-numbered subcarriers, and the second RS is corresponding to the odd-numbered subcarriers. Alternatively, the first RS is corresponding to the odd-numbered subcarriers, and the second RS is corresponding to the even-numbered subcarriers. It should be noted that, because the first RS and the second RS are at different subcarriers, sequence lengths of the first RS and the second RS may be different. Compared with the reference signal type 1, the reference signal type 2 is more flexible, and lengths of the first RS and the second RS do not need to be strictly limited to be the same.

Optionally, the first reference signal and the second reference signal are of a reference signal type 3. Specifically, the first reference signal and the second reference signal occupy a same symbol in a time domain, and occupy, in a frequency domain, transmission units that are completely or partly the same. For the transmission units that are completely or partly the same, for a unit sequence corresponding to the first reference signal and a unit sequence corresponding to the second reference signal, a same base sequence is used, and cyclic shift is performed in different manners.

Optionally, for a normal CP, i is 4. Optionally, for an extended CP, i is 3. That the symbol occupied by the first physical channel is different from the symbol occupied by the third physical channel includes:

The first physical channel is at a first symbol set and the third physical channel is at a second symbol set, or the first physical channel is at a second symbol set and the third physical channel is at a first symbol set. For symbols in the first symbol set and the second symbol set, refer to descriptions in step 201 in the foregoing embodiment. Details are not described herein again.

In this embodiment of the present disclosure, optionally, the first physical channel and the third physical channel completely or partly overlap in a frequency domain.

Optionally, the first processing unit 1102 is configured to:
generate a base sequence, where a length of the base sequence is greater than or equal to the quantity of subcarriers occupied by the first physical channel;
perform cyclic shift on the base sequence to obtain an initial reference signal sequence;
sample the initial reference signal sequence at an interval, to obtain a sequence of the first reference signal; and
demodulate the first physical channel according to the sequence of the first reference signal.

In this embodiment, the first sending unit 1103 sends the first downlink control information to the first terminal device; then, the first receiving unit 1101 receives the first reference signal and the first physical channel that are sent by the first terminal device, and the first processing unit 1102 demodulates the first physical channel according to the first reference signal.

In another embodiment of the present disclosure, the first processing unit 1102 may alternatively demodulate both the first physical channel and the second physical channel according to the first reference signal.

In another embodiment of the present disclosure, the first sending unit 1103 sends the first downlink control information to the first terminal device, and sends the second downlink control information to the second terminal device; the first receiving unit 1101 receives the first reference signal and the first physical channel that are sent by the first terminal device, and the first receiving unit 1101 also receives the second reference signal and the third physical channel that are sent by the second terminal device; then, the first processing unit 1102 separately demodulates the first physical channel and the third physical channel.

For configuration of the first reference signal and the second reference signal, refer to the foregoing embodiment. Details are not described herein again.

In this embodiment of the present disclosure, because the reference signal occupies one symbol and the physical channels each occupy two or three symbols, an uplink transmission TTI is three symbols or four symbols. Therefore, the network device in this embodiment of the present disclosure can reduce a data transmission time interval by performing the foregoing process. For one terminal device, a quantity of times of scheduling per unit of time can be increased. Therefore, a data transmission latency can be effectively reduced. In addition, in one slot, only one symbol is used for reference signal transmission. TTI reduction does not cause an increase in reference signal overheads.

Figure 12:
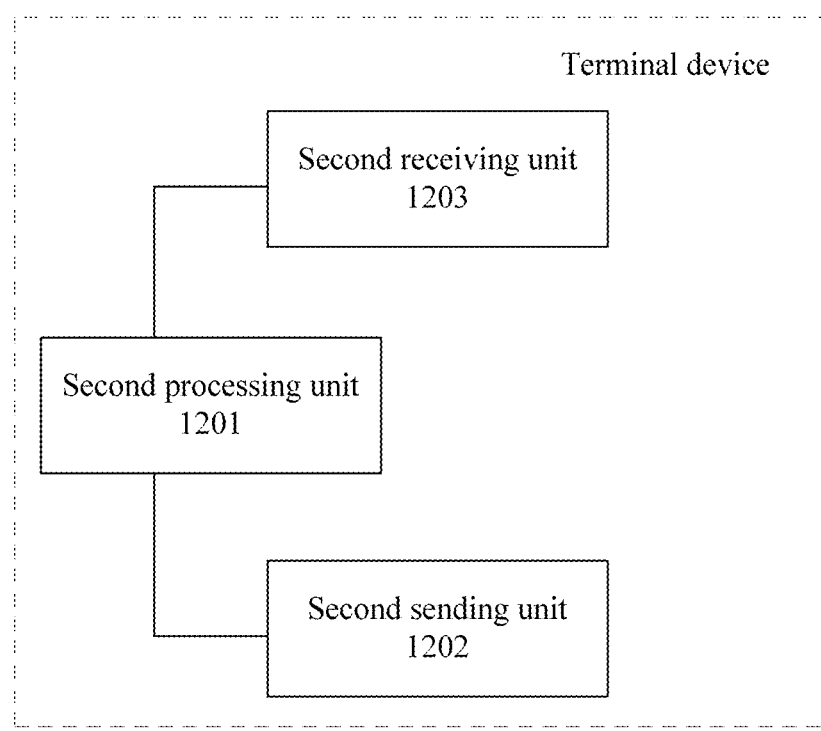
FIG. 12 is a schematic diagram of a terminal device according to an embodiment of the present disclosure.

An embodiment of the present disclosure further discloses a terminal device. FIG. 12 is a schematic diagram of the terminal device according to this embodiment of the present disclosure. As shown in FIG. 12, the terminal device includes:

a second processing unit 1201, configured to configure a first reference signal and a first physical channel, where the first reference signal is at the $i^{th}$ symbol in a slot, i is a positive integer less than 7, the first physical channel occupies n symbols in the slot, and n is 1, 2, or 3; and a second sending unit 1202, configured to send the first reference signal and the first physical channel to a network device.

Preferably, the first physical channel is a PUSCH, and the first reference signal is an RS corresponding to the PUSCH. The RS may be used as a PUSCH DMRS and/or SRS.

Optionally, the first physical channel is a PUCCH, and the first reference signal is an RS corresponding to the PUCCH. The RS may be used as a PUCCH DMRS and/or SRS.

In this embodiment of the present disclosure, preferably, for a normal CP, the first reference signal is at the fourth symbol (that is, i=4, and the reference signal is at the symbol whose sequence number is #3 in the slot). The first physical channel is at a first symbol set or a second symbol set. For an extended CP, preferably, the first reference signal may be at the third symbol (that is, i=3, and the reference signal is at the symbol whose sequence number is #2 in the slot). The first physical channel is at a first symbol set or a second symbol set.

Optionally, for the first symbol set and the second symbol set, refer to descriptions in step 201 in the foregoing embodiment. Details are not described herein again.

Optionally, the terminal device further includes a second receiving unit 1203, configured to: before the second processing unit 1201 configures the first reference signal and the first physical channel, receive first downlink control information sent by the network device 1001, where the first downlink control information includes configuration information used to indicate the first reference signal. For specific configuration information, refer to descriptions in step 201. Details are not described herein again.

In this embodiment, optionally, the first reference signal is one of the three types of reference signals described in step 201, and details are not described herein again.

Optionally, the first reference signal occupies contiguous subcarriers, and a quantity of subcarriers occupied by the first reference signal is greater than or equal to a quantity of subcarriers occupied by the first physical channel.

Optionally, the first reference signal occupies even-numbered subcarriers or odd-numbered subcarriers, and twice a quantity of subcarriers occupied by the first reference signal is greater than or equal to a quantity of subcarriers occupied by the first physical channel. Correspondingly, that a second processing unit 1201 configures a first reference signal includes:

generating a sequence of the first reference signal; and mapping the sequence of the first reference signal to the even-numbered subcarriers or the odd-numbered subcarriers.

Optionally, the second processing unit 1201 is further configured to:

generate a base sequence, where a length of the base sequence is greater than or equal to the quantity of subcarriers occupied by the first physical channel;

perform cyclic shift on the base sequence to obtain an initial reference signal sequence; and sample the initial reference signal sequence at an interval, to obtain the sequence of the first reference signal.

Optionally, if the first reference signal is further used for demodulating a second physical channel, the second processing unit 1201 is further configured to configure the second physical channel, where the second physical channel occupies m symbols in the slot, m is 1, 2, or 3, and the symbol occupied by the second physical channel is different from the symbol occupied by the first physical channel; and the second sending unit is further configured to send the second physical channel to the network device.

Optionally, for a normal CP, i is 4. Optionally, for an extended CP, i is 3. That the symbol occupied by the second physical channel is different from the symbol occupied by the first physical channel includes:

The first physical channel is at the first symbol set and the second physical channel is at the second symbol set, or the first physical channel is at the second symbol set and the second physical channel is at the first symbol set. For symbols in the first symbol set and the second symbol set, refer to descriptions in step 201 in the foregoing embodiment. Details are not described herein again.

In this embodiment, optionally, the first reference signal is one of the three types of reference signals described in step 201, and details are not described herein again. It should be noted that a relationship, between the first reference signal and the first physical channel, described in step 201 and step 202 is also applicable to the first reference signal and the second physical channel.

In this embodiment, the second receiving unit 1203 receives the downlink control information sent by the network device, the second processing unit 1201 configures the first reference signal and the first physical channel, and the second sending unit 1202 sends the first reference signal and the first physical channel to the network device. In another embodiment of the present disclosure, the second sending unit 1202 may further send the second physical channel to the network device.

In this embodiment of the present disclosure, because the reference signal occupies one symbol and the physical channels each occupy two or three symbols, an uplink transmission TTI is three symbols or four symbols. Therefore, the terminal device in this embodiment of the present disclosure can reduce a data transmission time interval by performing the foregoing process. For one terminal device, a quantity of times of scheduling per unit of time can be increased. Therefore, a data transmission latency can be effectively reduced. In addition, in one slot, only one symbol is used for reference signal transmission. TTI reduction does not cause an increase in reference signal overheads.

The embodiments of the present disclosure disclose the data transmission method, the network device, and the terminal device, so as to decrease the uplink transmission TTI to three symbols or four symbols. Therefore, the transmission time interval is reduced, and for one terminal device, a quantity of times of scheduling per unit of time can be increased. Therefore, the data transmission latency can be effectively reduced. In addition, in one slot, only one symbol is used for reference signal transmission. TTI reduction does not cause an increase in reference signal overheads.

A system embodiment is basically corresponding to a method embodiment. Therefore, for related parts, refer to partial descriptions in the method embodiment. The foregoing system embodiment is merely an example. The units described as separate parts may or may not be physically separate, and parts displayed as units may or may not be physical units, may be located in one position, or may be distributed on a plurality of network units. A part or all of the modules may be selected according to an actual requirement, to achieve the objectives of the solutions of the embodiments. A person of ordinary skill in the art can understand and implement the embodiments of the present disclosure without creative efforts.

The present disclosure may be described in the general context of a computer-executable instruction executed by a computer, for example, a program module. Generally, the program module includes a routine, a program, an object, a component, a data structure, and the like for executing a particular task or implementing a particular abstract data type. The present disclosure may also be practiced in a distributed computing environment. In such a distributed computing environment, a task is performed by a remote processing device that is connected by using a communications network. In the distributed computing environment, the program module may be located in local and remote computer storage media including a storage device.

A person of ordinary skill in the art may understand that all or a part of the steps in the foregoing method implementations may be implemented by a program instructing relevant hardware. The program may be stored in a computer readable storage medium. The storage medium herein includes a ROM, a RAM, a magnetic disk, an optical disc, and the like.

It should be further noted that in this specification, relational terms such as first and second are only used to distinguish one entity or operation from another entity or operation, and do not necessarily require or imply that any of such actual relationships or sequences exists between these entities or operations. Moreover, the term "include", "comprise", or any other variant thereof is intended to cover a non-exclusive inclusion, so that a process, a method, an article, or a device that includes a series of elements not only includes those elements, but also includes another element that is not explicitly listed, or also includes an element that is inherent to the process, the method, the article, or the device. When there are not more constraints, an element preceded by "includes a . . . " does not preclude existence of an additional same element in the process, the method, the article, or the device that includes the element.

The foregoing descriptions are merely examples of embodiments of the present disclosure, but are not intended to limit the protection scope of the present disclosure. Specific examples are used in this specification to describe the principle and implementations of the present disclosure. The descriptions of the foregoing embodiments are merely intended to help understand the method and the core idea of the present disclosure. In addition, a person of ordinary skill in the art may make, according to an idea of the present disclosure, changes with respect to the specific implementations and the application scope. To sum up, content of this specification shall not be construed as a limitation on the present disclosure. Any modification, equivalent replacement, or improvement made without departing from the spirit and principle of the present disclosure shall fall within the protection scope of the present disclosure.

What is claimed is:

1. A data transmission method, comprising:
receiving, by a network device from a first terminal device, a first reference signal and a first physical channel, wherein the first reference signal is at an $i^{th}$ symbol in a slot, i is a positive integer less than 7, the first physical channel occupies n symbols in the slot, and n is 1, 2, or 3; and
demodulating, by the network device, the first physical channel according to the first reference signal,
wherein before the receiving the first reference signal and the first physical channel, the method further comprises: sending, by the network device, first downlink control information to the first terminal device, wherein the first downlink control information comprises configuration information that indicates the first reference signal, and wherein the configuration information that indicates the first reference signal comprises a transmission comb of the first reference signal and cyclic shift of the first reference signal.

2. The method according to claim 1, wherein:
the first reference signal occupies contiguous subcarriers in a frequency domain, and a quantity of subcarriers occupied by the first reference signal is greater than or equal to a quantity of subcarriers occupied by the first physical channel.

3. The method according to claim 1, wherein:
the first reference signal occupies even-numbered subcarriers or odd-numbered subcarriers in a frequency domain, and twice a quantity of subcarriers occupied by the first reference signal is greater than or equal to a quantity of subcarriers occupied by the first physical channel.

4. A data transmission method, comprising:
configuring, by a terminal device, a first reference signal and a first physical channel, wherein the first reference signal is at an $i^{th}$ symbol in a slot, i is a positive integer less than 7, the first physical channel occupies n symbols in the slot, and n is 1, 2, or 3; and
sending, by the terminal device, the first reference signal and the first physical channel to a network device, wherein the first reference signal occupies odd-numbered subcarriers or even-numbered subcarriers in a frequency domain, and twice a quantity of subcarriers occupied by the first reference signal is greater than or equal to a quantity of subcarriers occupied by the first physical channel.

5. The method according to claim 4, wherein before the configuring the first reference signal and the first physical channel, the method further comprising:
receiving, by the terminal device, first downlink control information sent by the network device, wherein the first downlink control information comprises configuration information that indicates the first reference signal, and wherein the configuration information that indicates the first reference signal comprises a transmission comb of the first reference signal and cyclic shift of the first reference signal.

6. The method according to claim 4, wherein the first reference signal is further used for demodulating a second physical channel, the method further comprising:
configuring, by the terminal device, the second physical channel, wherein the second physical channel occupies m symbols in the slot, m is 1, 2, or 3, and the symbol occupied by the second physical channel is different from the symbol occupied by the first physical channel; and
sending, by the terminal device, the second physical channel to the network device.

7. A network device, comprising:
a memory storing instructions; and
a processor coupled to the memory to execute the instructions to:
receive a first reference signal and a first physical channel from a first terminal device, wherein the first reference signal is at an $i^{th}$ symbol in a slot, i is a positive integer less than 7, the first physical channel occupies n symbols in the slot, and n is 1, 2, or 3;
demodulate the first physical channel according to the first reference signal;
after receiving the first reference signal and the first physical channel, receive a second physical channel sent by the first terminal device, wherein the second physical channel occupies m symbols in the slot, m is 1, 2, or 3, and the symbol occupied by the second physical channel is different from the symbol occupied by the first physical channel; and
demodulate the second physical channel according to the first reference signal.

8. The device according to claim 7, wherein the processor further executes the instructions to:
send first downlink control information to the first terminal device before receiving the first reference signal and the first physical channel, wherein the first downlink control information comprises configuration information used to indicate the first reference signal, and wherein the configuration information that indicates the first reference signal comprises a transmission comb of the first reference signal and cyclic shift of the first reference signal.

9. The device according to claim 7, wherein:
the first reference signal occupies contiguous subcarriers in a frequency domain, and a quantity of subcarriers occupied by the first reference signal is greater than or equal to a quantity of subcarriers occupied by the first physical channel.

10. The device according to claim 7, wherein the processor further executes the instructions to:
receive a second reference signal and a third physical channel from a second terminal device, wherein the second reference signal is at the $i^{th}$ symbol in the slot, i is the positive integer less than 7, the third physical channel occupies p symbols in the slot, and p is 1, 2, or 3; and
demodulate the third physical channel according to the second reference signal, wherein the symbol occupied by the first physical channel is different from the symbol occupied by the third physical channel.

11. The device according to claim 10, wherein the processor further executes the instructions to:
send second downlink control information to the second terminal device before receiving the second reference signal and the third physical channel, wherein the second downlink control information comprises configuration information that indicates the second reference signal, the configuration information that indicates the second reference signal comprises a transmission comb of the second reference signal and cyclic shift of the second reference signal.

12. The device according to claim 10, wherein:
the first reference signal occupies odd-numbered subcarriers in a frequency domain, and the second reference signal occupies even-numbered subcarriers in the frequency domain; or
the second reference signal occupies odd-numbered subcarriers in a frequency domain, and the first reference signal occupies even-numbered subcarriers in the frequency domain; or
twice a quantity of subcarriers occupied by the first reference signal is greater than or equal to a quantity of subcarriers occupied by the first physical channel, and twice a quantity of subcarriers occupied by the second reference signal is greater than or equal to a quantity of subcarriers occupied by the third physical channel.

13. The device according to claim 12, wherein the processor further executes the instructions to:
generate a base sequence, wherein a length of the base sequence is greater than or equal to the quantity of subcarriers occupied by the first physical channel;
perform cyclic shift on the base sequence to obtain an initial reference signal sequence;
sample the initial reference signal sequence at an interval, to obtain a sequence of the first reference signal; and
demodulate the first physical channel according to the sequence of the first reference signal.

14. The device according to claim 7, wherein:
the first reference signal occupies odd-numbered subcarriers or even-numbered subcarriers in a frequency domain, and twice a quantity of subcarriers occupied by the first reference signal is greater than or equal to a quantity of subcarriers occupied by the first physical channel.

15. A terminal device, comprising:
a memory storing instructions; and
a processor coupled to the memory to execute the instructions to:
configure a first reference signal and a first physical channel, wherein the first reference signal is at an $i^{th}$ symbol in a slot, i is a positive integer less than 7, the first physical channel occupies n symbols in the slot, and n is 1, 2, or 3; and
send the first reference signal and the first physical channel to a network device;
wherein before configuring the first reference signal and the first physical channel, the processor further executes the instructions to: receive first downlink control information sent by the network device, wherein the first downlink control information comprises configuration information that indicates the first reference signal, and wherein the configuration information that indicates the first reference signal comprises a transmission comb of the first reference signal and cyclic shift of the first reference signal.

16. The device according to claim 15, wherein the first reference signal occupies odd-numbered subcarriers or even-numbered subcarriers in a frequency domain, and twice a quantity of subcarriers occupied by the first reference signal is greater than or equal to a quantity of subcarriers occupied by the first physical channel.

17. The device according to claim 15, wherein the first reference signal is further used for demodulating a second physical channel, and the processor further executes the instructions to:
configure the second physical channel, wherein the second physical channel occupies m symbols in the slot, m is 1, 2, or 3, and the symbol occupied by the second physical channel is different from the symbol occupied by the first physical channel; and
send the second physical channel to the network device.

18. A non-transitory computer-readable storage medium comprising instructions that, when executed, cause a processor to:
configure a first reference signal and a first physical channel, wherein the first reference signal is at an $i^{th}$ symbol in a slot, i is a positive integer less than 7, the first physical channel occupies n symbols in the slot, and n is 1, 2, or 3;
send the first reference signal and the first physical channel to a network device; and
before configuring the first reference signal and the first physical channel, receive first downlink control information sent by the network device, wherein the first downlink control information comprises configuration information that indicates the first reference signal, and wherein the configuration information that indicates the first reference signal comprises a transmission comb of the first reference signal and cyclic shift of the first reference signal.

* * * * *